(12) United States Patent
Boehrs et al.

(10) Patent No.: US 10,427,083 B2
(45) Date of Patent: *Oct. 1, 2019

(54) AIR FILTER ARRANGEMENT; ASSEMBLY; AND METHODS

(71) Applicant: Donaldson Company, Inc., Minneapolis, MN (US)

(72) Inventors: Bruce Boehrs, Blaine, MN (US); Paul Wendt, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 373 days.

This patent is subject to a terminal disclaimer.

(21) Appl. No.: 15/211,099

(22) Filed: Jul. 15, 2016

(65) Prior Publication Data

US 2017/0028340 A1    Feb. 2, 2017

Related U.S. Application Data

(63) Continuation of application No. 14/492,315, filed on Sep. 22, 2014, now Pat. No. 9,399,972, which is a continuation of application No. 13/744,731, filed on Jan. 18, 2013, now Pat. No. 8,840,699, which is a continuation of application No. 12/083,364, filed as
(Continued)

(51) Int. Cl.
| | |
|---|---|
| *B01D 46/52* | (2006.01) |
| *B01D 46/00* | (2006.01) |
| *B01D 46/10* | (2006.01) |
| *F02M 35/024* | (2006.01) |

(52) U.S. Cl.
CPC ....... *B01D 46/526* (2013.01); *B01D 46/0005* (2013.01); *B01D 46/10* (2013.01); *F02M 35/024* (2013.01); *F02M 35/02416* (2013.01); *B01D 2271/02* (2013.01); *B01D 2275/205* (2013.01)

(58) Field of Classification Search
None
See application file for complete search history.

(56) References Cited

U.S. PATENT DOCUMENTS

| 991,572 A | 5/1911 | Weisenstein |
|---|---|---|
| 1,079,042 A | 11/1913 | Duncan |

(Continued)

FOREIGN PATENT DOCUMENTS

| CA | 997684 | 9/1976 |
|---|---|---|
| DE | 3405719 A1 | 8/1985 |

(Continued)

OTHER PUBLICATIONS

U.S. Appl. No. 60/455,643, filed Mar. 18, 2003, Schrage et al, Mar. 2003.
(Continued)

*Primary Examiner* — Amber R Orlando
(74) *Attorney, Agent, or Firm* — Merchant & Gould P.C.

(57) ABSTRACT

An air filter media construction or arrangement is disclosed. The air filter media construction or arrangement includes facing media secured to fluted media. A preferred projection/receiver arrangement is described. Also, a useful seal arrangement is described. Air cleaner assemblies, methods of assembly and use are also provided.

19 Claims, 19 Drawing Sheets

Related U.S. Application Data application No. PCT/US2006/039414 on Oct. 10, 2006, now Pat. No. 8,357,219.

(60) Provisional application No. 60/725,453, filed on Oct. 11, 2005.

(56) References Cited

U.S. PATENT DOCUMENTS

| | | |
|---|---|---|
| 1,103,717 A | 7/1914 | Walton et al. |
| 1,942,600 A | 1/1934 | Hornung |
| 2,074,294 A | 11/1935 | Woodruff |
| 2,599,604 A | 6/1952 | Bauer et al. |
| 2,887,177 A | 5/1959 | Mund et al. |
| 2,890,796 A | 6/1959 | Blood |
| 2,914,785 A | 12/1959 | Ela |
| 2,942,127 A | 6/1960 | Harse |
| 3,019,854 A | 3/1962 | O'Bryant |
| 3,025,963 A | 3/1962 | Bauer |
| 3,209,917 A | 10/1965 | Yelinek |
| 3,442,067 A | 5/1969 | Swenson |
| 3,489,241 A | 1/1970 | Steinberg |
| 3,494,113 A | 2/1970 | Kinney |
| 3,676,242 A | 7/1972 | Prentice |
| 3,695,437 A | 10/1972 | Shaltis |
| 3,740,933 A | 6/1973 | Hollowell |
| 3,807,150 A | 4/1974 | Maracle |
| 3,841,953 A | 10/1974 | Kohkamp et al. |
| 3,878,014 A | 4/1975 | Melead |
| 3,878,041 A | 4/1975 | Melead |
| 3,912,631 A | 10/1975 | Turman |
| 4,018,580 A | 4/1977 | Bürkholz et al. |
| 4,065,341 A | 12/1977 | Cub |
| 4,158,449 A | 6/1979 | Sun et al. |
| 4,159,899 A | 7/1979 | Deschenes |
| 4,162,906 A | 7/1979 | Sullivan et al. |
| 4,236,902 A | 12/1980 | Fricke |
| 4,255,175 A | 3/1981 | Wilkins |
| 4,282,186 A | 8/1981 | Nonnemann et al. |
| 4,285,909 A | 8/1981 | Mizusawa et al. |
| 4,310,419 A | 1/1982 | Nara et al. |
| 4,322,231 A | 3/1982 | Hilzendeger et al. |
| 4,394,147 A | 7/1983 | Caddy et al. |
| 4,402,830 A | 9/1983 | Pall |
| 4,410,427 A | 10/1983 | Wydeven |
| 4,430,223 A | 2/1984 | Miyakawa et al. |
| 4,449,993 A | 5/1984 | Bergeron |
| 4,480,359 A | 11/1984 | Koster |
| 4,498,989 A | 2/1985 | Miyakawa et al. |
| 4,537,608 A | 8/1985 | Koslow |
| 4,578,091 A | 3/1986 | Borja |
| 4,589,983 A | 5/1986 | Wydeven |
| 4,617,176 A | 10/1986 | Merry |
| 4,678,489 A | 7/1987 | Bertelsen |
| 4,704,143 A | 11/1987 | Percy |
| 4,720,292 A | 1/1988 | Engel et al. |
| 4,759,783 A | 7/1988 | Machado |
| 4,767,531 A | 8/1988 | Holzer |
| 4,783,029 A | 11/1988 | Geppert et al. |
| 4,824,564 A | 4/1989 | Edwards et al. |
| 4,861,359 A * | 8/1989 | Tettman ............ B01D 46/0031 55/419 |
| 4,925,469 A | 5/1990 | Clement et al. |
| 4,925,561 A | 5/1990 | Ishii et al. |
| 4,963,170 A | 10/1990 | Weber et al. |
| 4,997,556 A | 3/1991 | Yano et al. |
| 4,999,038 A | 3/1991 | Matsumoto et al. |
| 5,013,182 A | 5/1991 | Coulvonvaux et al. |
| 5,030,264 A | 7/1991 | Klotz et al. |
| 5,049,326 A | 9/1991 | Matsumoto et al. |
| 5,069,790 A | 12/1991 | Mordeki |
| 5,082,476 A | 1/1992 | Kahlbaugh et al. |
| 5,108,604 A | 4/1992 | Robbins et al. |
| 5,125,941 A | 6/1992 | Ernst et al. |
| 5,128,037 A | 7/1992 | Pearl et al. |
| 5,174,895 A | 12/1992 | Drori |
| 5,211,846 A | 5/1993 | Kott et al. |
| 5,213,596 A | 5/1993 | Kume et al. |
| 5,238,474 A | 8/1993 | Kahlbaugh et al. |
| 5,303,412 A | 4/1994 | Forster et al. |
| 5,304,312 A | 4/1994 | Forster et al. |
| 5,304,351 A | 4/1994 | Tanaka et al. |
| 5,350,515 A | 9/1994 | Stark et al. |
| 5,415,677 A | 5/1995 | Ager et al. |
| 5,435,870 A | 7/1995 | Takagaki et al. |
| 5,472,463 A | 12/1995 | Herman et al. |
| 5,484,466 A | 1/1996 | Brown et al. |
| 5,487,767 A | 1/1996 | Brown |
| 5,490,930 A | 2/1996 | Krull et al. |
| 5,494,487 A | 2/1996 | Koike |
| 5,494,497 A | 2/1996 | Lee |
| 5,536,290 A | 7/1996 | Stark et al. |
| 5,543,007 A | 8/1996 | Takagaki et al. |
| 5,547,480 A | 8/1996 | Coulonvaux |
| 5,569,311 A | 10/1996 | Oda et al. |
| 5,582,146 A | 12/1996 | Linsbauer et al. |
| 5,601,717 A | 2/1997 | Villette et al. |
| 5,611,922 A | 3/1997 | SteNe |
| 5,613,992 A | 3/1997 | Engel |
| 5,645,718 A | 7/1997 | Hardison et al. |
| 5,672,399 A | 9/1997 | Kahlbaugh et al. |
| 5,683,660 A | 11/1997 | Wirth et al. |
| 5,685,985 A | 11/1997 | Brown et al. |
| 5,690,712 A | 11/1997 | Engel |
| 5,714,126 A | 2/1998 | Frund |
| 5,730,766 A | 3/1998 | Clements |
| 5,730,768 A | 3/1998 | Kaminaga et al. |
| 5,740,774 A | 4/1998 | Kennedy |
| 5,755,843 A | 5/1998 | Sundquist |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| 5,800,587 A | 9/1998 | Kahlbaugh et al. |
| 5,820,646 A | 10/1998 | Gillingham et al. |
| 5,863,313 A | 1/1999 | Coulonvaux |
| 5,895,574 A | 4/1999 | Friedmann et al. |
| 5,897,676 A | 4/1999 | Engel |
| 5,902,364 A | 5/1999 | Tokar et al. |
| 5,908,480 A | 6/1999 | Ban et al. |
| 5,951,729 A | 9/1999 | Ernst et al. |
| D416,308 S | 11/1999 | Ward et al. |
| D417,268 S | 11/1999 | Gillingham |
| 6,007,169 A | 12/1999 | Li et al. |
| 6,048,386 A | 4/2000 | Gillingham et al. |
| D425,189 S | 5/2000 | Gillingham et al. |
| 6,099,606 A | 8/2000 | Miller et al. |
| 6,149,700 A | 11/2000 | Morgan et al. |
| 6,165,355 A | 12/2000 | Coulonvaux et al. |
| 6,179,890 B1 | 1/2001 | Romas et al. |
| 6,190,432 B1 | 2/2001 | Gieseke et al. |
| 6,210,469 B1 | 4/2001 | Tokar |
| 6,221,122 B1 | 4/2001 | Gieseke et al. |
| 6,231,630 B1 | 5/2001 | Ernst et al. |
| 6,235,195 B1 | 5/2001 | Tokar |
| 6,264,713 B1 | 7/2001 | Lewis |
| 6,273,938 B1 * | 8/2001 | Fanselow ........... B01D 39/1623 55/497 |
| 6,296,025 B1 | 10/2001 | Gregg et al. |
| 6,299,661 B1 | 10/2001 | Bloomer et al. |
| 6,322,602 B2 | 11/2001 | Engel et al. |
| 6,348,084 B1 | 2/2002 | Gieseke et al. |
| 6,348,085 B1 | 2/2002 | Tokar et al. |
| 6,350,291 B1 | 2/2002 | Gieseke et al. |
| 6,368,374 B1 | 4/2002 | Tokar et al. |
| D461,003 S | 7/2002 | Gieseke et al. |
| 6,416,605 B1 | 7/2002 | Golden |
| 6,447,567 B1 | 9/2002 | Ehrenberg et al. |
| 6,458,418 B2 | 10/2002 | Langer et al. |
| 6,475,446 B1 | 11/2002 | Horiike et al. |
| 6,517,598 B2 | 2/2003 | Anderson et al. |
| 6,572,667 B1 | 6/2003 | Greif et al. |
| 6,585,792 B2 | 7/2003 | Schneider et al. |
| 6,598,580 B2 | 7/2003 | Baumann et al. |

(56) References Cited

U.S. PATENT DOCUMENTS

| | | | |
|---|---|---|---|
| 6,599,344 B2 | 7/2003 | Tokar et al. |
| 6,610,117 B2 | 8/2003 | Gieseke et al. |
| D483,459 S | 12/2003 | DeWit et al. |
| 6,743,317 B2 | 6/2004 | Wydeven |
| 6,783,565 B2 | 8/2004 | Gieseke et al. |
| 6,953,124 B2 | 10/2005 | Winter et al. |
| 6,966,940 B2 | 11/2005 | Krisko et al. |
| 6,994,744 B2 | 2/2006 | Tokar et al. |
| 7,004,986 B2 | 2/2006 | Kopec et al. |
| 7,008,467 B2 | 3/2006 | Krisko et al. |
| 7,097,694 B1 | 8/2006 | Jaroszczyk et al. |
| 7,211,124 B2 | 5/2007 | Gieseke et al. |
| 7,255,300 B2 | 8/2007 | Johnston |
| 7,270,692 B2 | 9/2007 | Gillingham et al. |
| 7,303,604 B2 | 12/2007 | Gieske et al. |
| 7,318,851 B2 | 1/2008 | Brown et al. |
| 7,323,029 B2 | 1/2008 | Engelland et al. |
| 7,329,326 B2 | 2/2008 | Wagner et al. |
| 7,364,601 B2 | 4/2008 | Xu et al. |
| 7,393,375 B2 | 7/2008 | Xu et al. |
| 7,488,365 B2 | 2/2009 | Golden et al. |
| 7,501,004 B2 | 3/2009 | Tschech et al. |
| 7,601,209 B1 * | 10/2009 | Gunderson | B01D 46/002 |
| | | | 181/231 |
| 7,615,091 B2 | 11/2009 | Gieseke et al. |
| 7,625,419 B2 | 12/2009 | Nelson et al. |
| 7,648,545 B2 | 1/2010 | Amesoeder et al. |
| 7,655,074 B2 | 2/2010 | Nepsund et al. |
| 7,658,777 B2 * | 2/2010 | Kopec | B01D 46/0005 |
| | | | 55/385.3 |
| 7,708,797 B2 | 5/2010 | Kuempel et al. |
| 7,713,321 B2 | 5/2010 | Kuempel et al. |
| 7,736,410 B2 | 6/2010 | Kuempel et al. |
| 7,967,898 B2 | 1/2011 | Sporre et al. |
| 7,967,886 B2 | 6/2011 | Schrage et al. |
| 7,972,404 B2 | 7/2011 | Kuempel et al. |
| 7,972,405 B2 | 7/2011 | Engelland et al. |
| 7,993,422 B2 | 8/2011 | Krisko et al. |
| 7,997,425 B2 | 8/2011 | Golden et al. |
| 8,002,869 B2 | 8/2011 | Nepsund et al. |
| 8,012,233 B2 | 9/2011 | Kuempel et al. |
| 8,016,903 B2 | 9/2011 | Nelson et al. |
| 8,034,144 B2 | 10/2011 | Gieseke et al. |
| 8,034,145 B2 * | 10/2011 | Boehrs | B01D 46/526 |
| | | | 55/502 |
| 8,048,188 B2 | 11/2011 | Widerski et al. |
| 8,062,399 B2 | 11/2011 | Nelson et al. |
| 8,083,825 B2 | 12/2011 | Mosset et al. |
| 8,101,003 B2 | 1/2012 | Krisko et al. |
| 8,152,888 B2 | 4/2012 | Nelson |
| 8,163,057 B2 | 4/2012 | Blossey |
| 8,206,479 B2 | 6/2012 | Nepsund et al. |
| 8,216,332 B2 | 7/2012 | Kopec et al. |
| 8,226,786 B2 | 7/2012 | Schrage et al. |
| 8,241,383 B2 | 8/2012 | Schrage et al. |
| 8,241,384 B2 | 8/2012 | Schrage et al. |
| 8,277,532 B2 | 10/2012 | Reichter |
| 8,292,983 B2 | 10/2012 | Reichter et al. |
| 8,328,897 B2 | 12/2012 | Nelson et al. |
| 8,343,245 B2 | 1/2013 | Coulonvaux et al. |
| 8,357,219 B2 | 1/2013 | Boehrs et al. |
| 8,382,875 B2 | 2/2013 | Engelland et al. |
| 8,382,876 B2 | 2/2013 | Widerski et al. |
| 8,496,723 B2 | 7/2013 | Reichter et al. |
| 8,518,141 B2 | 8/2013 | Schrage et al. |
| 8,636,820 B2 | 1/2014 | Reichter et al. |
| 8,709,119 B2 | 4/2014 | Reichter et al. |
| 8,840,699 B2 | 9/2014 | Boehrs et al. |
| 8,906,128 B2 | 12/2014 | Reichter et al. |
| 9,114,346 B2 | 8/2015 | Schrage et al. |
| 9,180,399 B2 | 11/2015 | Reichter et al. |
| 9,399,972 B2 * | 7/2016 | Boehrs | B01D 46/10 |
| 9,527,023 B2 | 12/2016 | Reichter et al. |
| 2001/0003893 A1 | 6/2001 | Ramos et al. |
| 2001/0037631 A1 | 11/2001 | Morgan et al. |
| 2002/0184864 A1 | 12/2002 | Bishop et al. |
| 2002/0185007 A1 | 12/2002 | Xu et al. |
| 2004/0020177 A1 | 2/2004 | Ota et al. |
| 2004/0040271 A1 | 5/2004 | Kopec et al. |
| 2004/0173097 A1 | 9/2004 | Engelland et al. |
| 2004/0221555 A1 | 11/2004 | Engelland et al. |
| 2005/0081497 A1 * | 4/2005 | Connor | B01D 46/0005 |
| | | | 55/493 |
| 2005/0252848 A1 * | 11/2005 | Miller | B01D 35/147 |
| | | | 210/445 |
| 2006/0081528 A1 | 4/2006 | Oelpke et al. |
| 2006/0086075 A1 | 4/2006 | Scott et al. |
| 2006/0090431 A1 | 5/2006 | Brown |
| 2006/0090432 A1 | 5/2006 | Merritt |
| 2006/0090434 A1 * | 5/2006 | Brown | B01D 46/527 |
| | | | 55/498 |
| 2006/0091061 A1 | 5/2006 | Brown |
| 2006/0091064 A1 | 5/2006 | Brown et al. |
| 2006/0091066 A1 | 5/2006 | Driml et al. |
| 2006/0091084 A1 | 5/2006 | Merritt et al. |
| 2006/0101999 A1 | 5/2006 | Steins |
| 2006/0121768 A1 | 6/2006 | Dworatzek et al. |
| 2006/0123754 A1 | 6/2006 | Oelpke et al. |
| 2006/0151655 A1 | 7/2006 | Johnston |
| 2006/0163150 A1 | 7/2006 | Golden |
| 2006/0260285 A1 | 11/2006 | Pfeiffer et al. |
| 2007/0006560 A1 | 1/2007 | Ruhland et al. |
| 2007/0169449 A1 | 7/2007 | Merritt |
| 2007/0186527 A1 | 8/2007 | Lampert et al. |
| 2007/0186528 A1 | 8/2007 | Wydeven et al. |
| 2007/0193236 A1 | 8/2007 | Merritt |
| 2007/0251201 A1 | 11/2007 | Miller |
| 2007/0261662 A1 | 11/2007 | Lampert et al. |
| 2007/0271885 A1 | 11/2007 | Rieger et al. |
| 2007/0271886 A1 | 11/2007 | Rieger et al. |
| 2007/0289265 A1 | 12/2007 | Coulonvaux et al. |
| 2008/0011896 A1 | 1/2008 | Johnston et al. |
| 2008/0022641 A1 | 1/2008 | Engelland et al. |
| 2008/0060329 A1 | 3/2008 | Brown et al. |
| 2008/0086990 A1 * | 4/2008 | Kuempel | B01D 46/2411 |
| | | | 55/357 |
| 2008/0115470 A1 | 5/2008 | Kuempel et al. |
| 2008/0135470 A1 | 6/2008 | Merritt et al. |
| 2008/0250766 A1 | 10/2008 | Schrage et al. |
| 2008/0271423 A1 | 11/2008 | Nepsund et al. |
| 2008/0307759 A1 * | 12/2008 | Reichter | B01D 46/0005 |
| | | | 55/428 |
| 2009/0090091 A1 | 4/2009 | Kuempel et al. |

FOREIGN PATENT DOCUMENTS

| | | |
|---|---|---|
| DE | 88 08 632 | 9/1988 |
| DE | 2155522 | 5/1993 |
| DE | 40 31 014 C2 | 11/1993 |
| DE | 44 15 890 A1 | 11/1995 |
| EP | 0 726 389 | 8/1996 |
| EP | 0 738 528 | 10/1996 |
| EP | 0897317 | 7/2000 |
| EP | 1 731 749 A1 | 12/2006 |
| FR | 2 034 160 | 12/1970 |
| GB | 703823 | 2/1954 |
| GB | 1275651 | 5/1972 |
| JP | S58-151417 | 3/1982 |
| JP | 59-26113 | 2/1984 |
| JP | S60-155921 | 3/1984 |
| JP | 59-170669 | 11/1984 |
| JP | 60-112320 | 7/1985 |
| JP | H02-48118 | 9/1988 |
| JP | 1-11971 | 4/1989 |
| JP | 01 171615 A | 10/1989 |
| JP | 63-122617 | 6/1998 |
| JP | H02-48117 | 9/1998 |

(56) References Cited

FOREIGN PATENT DOCUMENTS

WO      WO 88/03431      5/1988
WO      WO 2004/020075 A2      3/2004

OTHER PUBLICATIONS

Search report and written opinion to PCT/US2006/039414 dated Feb. 14, 2007.
Pending claims corresponding to U.S. Appl. No. 14/563,561 dated Oct. 13, 2016.
Pending claims corresponding to U.S. Appl. No. 14/935,860 dated Oct. 13, 2016.
Pending claims corresponding to U.S. Appl. No. 14/263,195 dated Oct. 13, 2016.
Pending claims corresponding to U.S. Appl. No. 15/788,937 dated Aug. 6, 2018.
Pending claims corresponding to U.S. Appl. No. 14/935,860 dated Aug. 6, 2018.
Pending claims corresponding to U.S. Appl. No. 15/387,820 dated Aug. 6, 2018.

* cited by examiner

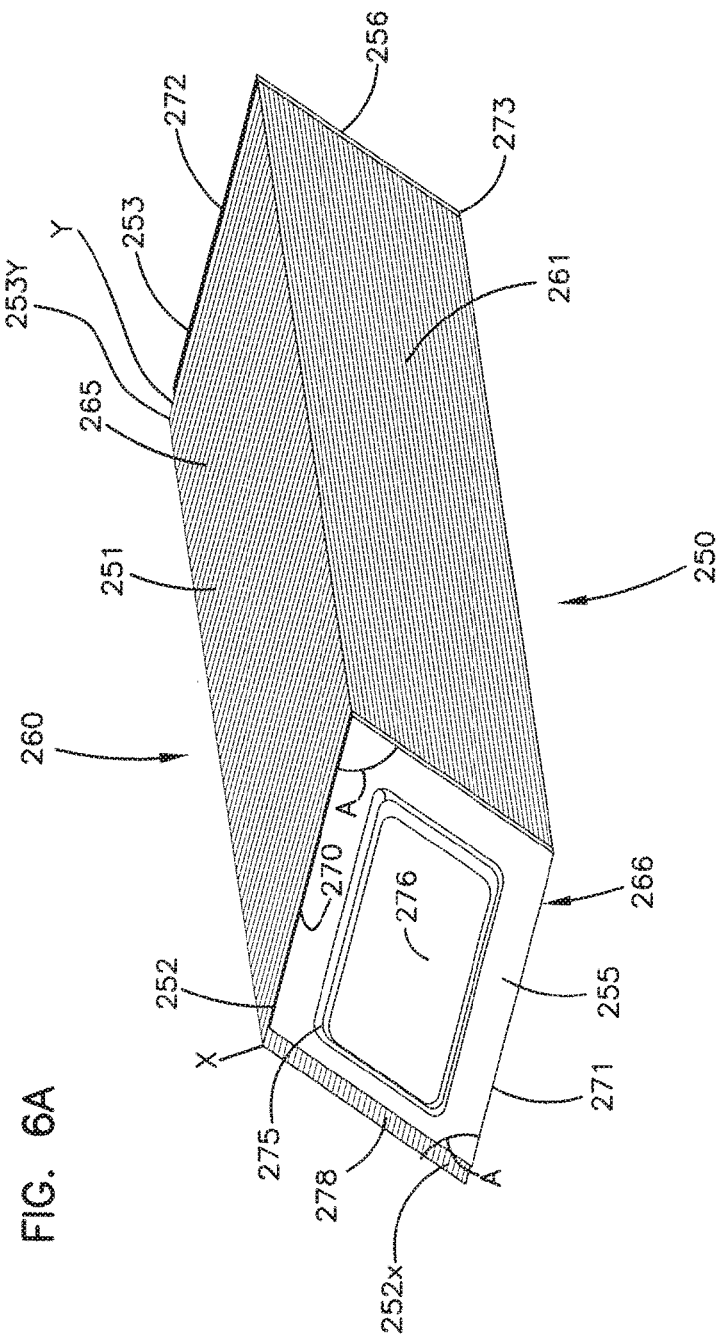

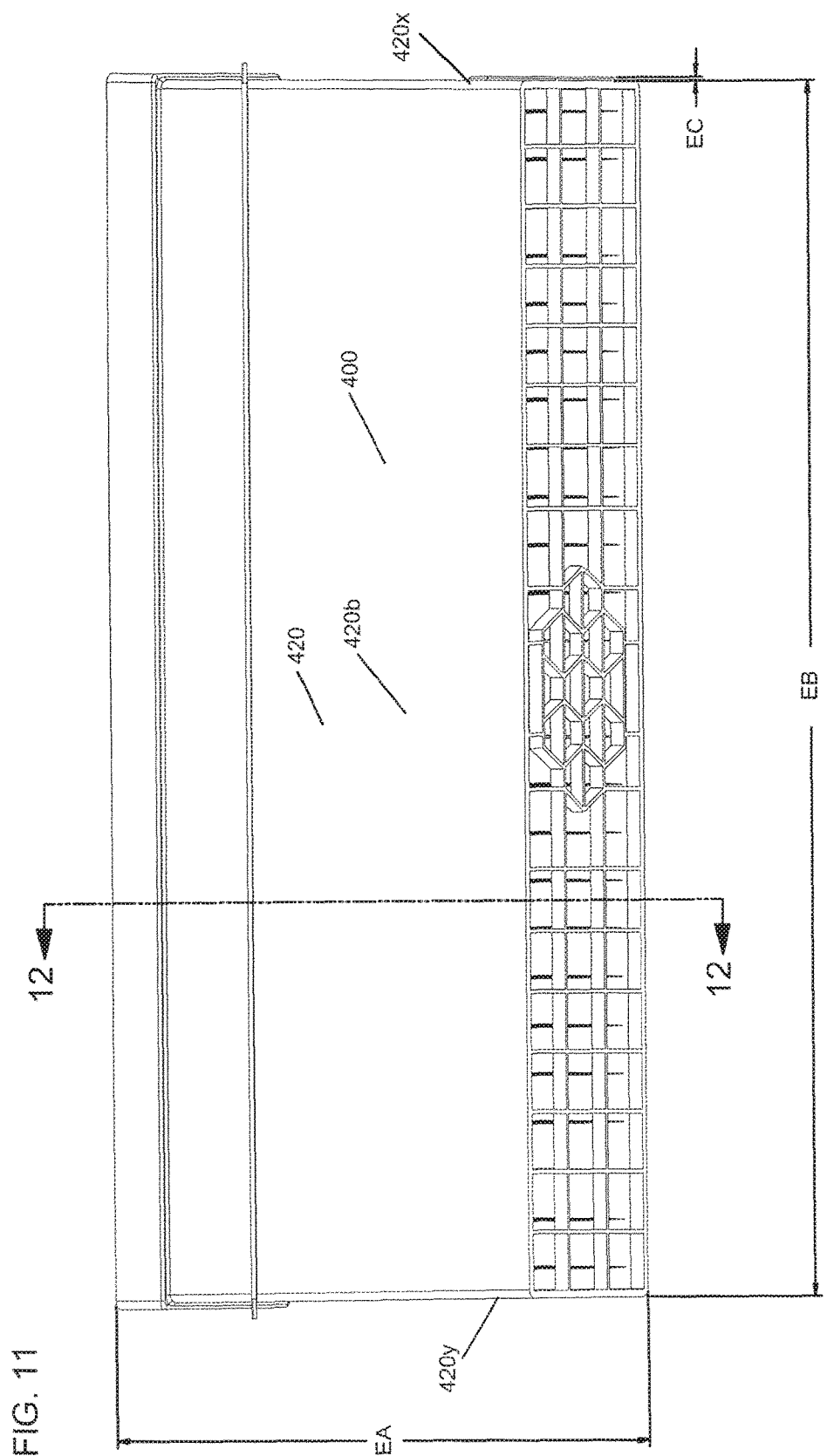

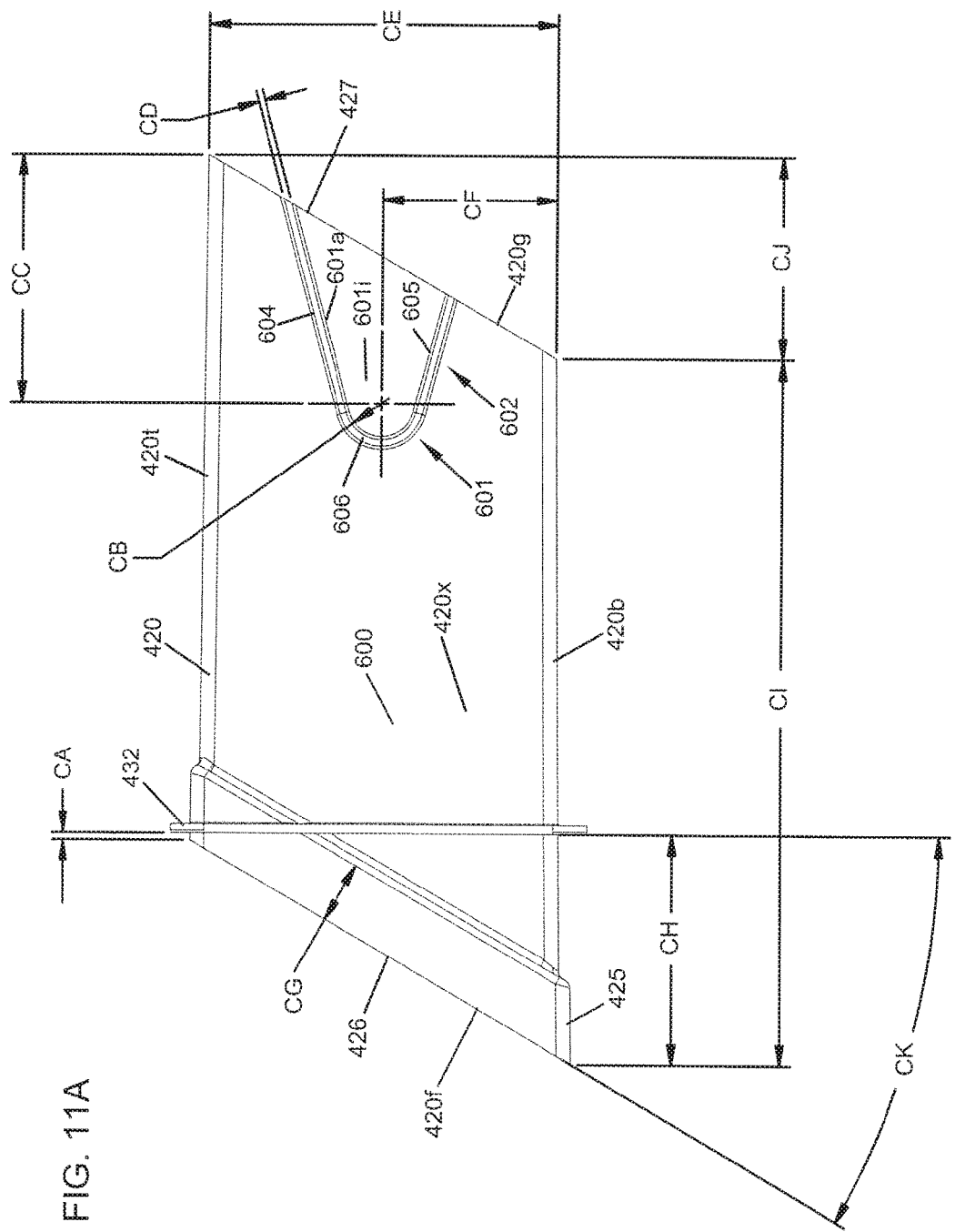

AIR FILTER ARRANGEMENT; ASSEMBLY; AND METHODS

This application is a continuation filing of U.S. Ser. No. 14/492,315, which issued as U.S. Pat. No. 9,399,972 on Jul. 26, 2016. U.S. Ser. No. 14/492,315 is a continuation of Ser. No. 13/744,731, filed Jan. 18, 2013 and which issued as U.S. Pat. No. 8,840,699. U.S. Ser. No. 13/744,731 was a continuation of U.S. Ser. No. 12/083,364, filed Nov. 6, 2009 and which issued as U.S. Pat. No. 8,357,219; and, which was a National Stage filing of PCT/US2006/039414, filed Oct. 10, 2006; the PCT claiming benefit of priority to 60/725,453, filed Oct. 11, 2005. The complete disclosures of U.S. Ser. No. 14/492,315; U.S. Ser. No. 13/744,731; U.S. Ser. No. 12/083,364; PCT/US2006/039414; and, 60/725,453 are incorporated herein by reference. A claim of priority is made to each of U.S. Ser. Nos. 14/492,315; 13/744,731; U.S. Ser. No. 12/083,364; PCT/US2006/039414; and, U.S. 60/725,453 to the extent appropriate.

FIELD OF THE DISCLOSURE

The present disclosure relates to filter media for use in filtering gases. The disclosure particularly relates to media packs that use z-filter media which comprises a fluted media secured to facing media, formed into a media pack. More specifically, the disclosure relates to such media packs and their inclusion in serviceable filter cartridge arrangements, typically for use in air cleaners. Air cleaner arrangements and methods of assembly and use are also described.

BACKGROUND

Fluid streams, such as air, can carry contaminant material therein. In many instances, it is desired to filter some or all of the contaminant material from the fluid stream. For example, air flow streams to engines (for example combustion air) for motorized vehicles or for power generation equipment, gas streams to gas turbine systems and air streams to various combustion furnaces, carry particulate contaminant therein that should be filtered. It is preferred for such systems, that selected contaminant material be removed from (or have its level reduced in) the fluid. A variety of air filter arrangements (air cleaners) have been developed for such contaminant control.

In many instances, there is limited space for, and shape limitations placed on, the air cleaner; especially for units that are positioned within an engine compartment of a vehicle such as a truck, in use. Since air cleaners typically include a serviceable part, i.e., a removable and replaceable filter element or cartridge, problems can arise if there is not provided sufficient room for opening of, and access to, the air cleaner for servicing.

In general, improvements are sought for air cleaner arrangements, for a variety of vehicles, as new vehicles and new vehicle demands are developed.

SUMMARY

According to the present disclosure, features useable in preferred filter cartridges, such as air filter cartridges are provided. The features can be used together to provide a preferred filter cartridge, however some advantageous cartridges can be constructed which use only selected ones of the features. In addition, methods of construction and use are provided.

In one aspect of the present disclosure, a preferred media pack is provided, for use in or as air filter cartridges. The media pack comprises a stacked z-filter arrangement having opposite flow faces and opposite sides. At the opposite sides, ends of stacked strips are preferably secured in, and sealed by, molded end pieces. Preferably the molded end pieces comprise molded polyurethane.

In one example arrangement, the stacked z-filter media pack arrangement comprises a slanted stacked z-filter media pack arrangement.

Also according to the present disclosure there is provided a filter cartridge which includes a stacked z-filter arrangement. A filter cartridge described also comprises a preform or shell in which the media pack is positioned. The preform preferably comprises four sides and a perimeter seal arrangement. A convenient perimeter seal arrangement is shown. Also, an advantage of intervention arrangement on the cartridge, for engagement with a housing, is provided.

Various other preferred features for a preform and a filter cartridge, for a described type of application, are shown.

According to another aspect of the present disclosure, a projection/receiver arrangement for interaction between a cartridge and housing is provided. An example arrow shaped arrangement is shown.

Also according to an aspect of the present disclosure an air cleaner arrangement utilizing a preferred filter cartridge as described, is provided. The air cleaner arrangement generally comprises a housing having two sections, separable from one another and configured to engage a seal arrangement of the filter cartridge therebetween, when assembled and secured to one another. Example features for the housing arrangement are provided.

There is no requirement for arrangements to include all of the preferred features characterized herein for some improvement to result.

Many of the features described herein are related to an arrangement described in current PCT application, PCT/US2005/020593 filed Jun. 10, 2005. The complete disclosure of that PCT application is incorporated herein by reference.

BRIEF DESCRIPTION OF THE DRAWINGS

FIG. 6A is a schematic perspective view of a slanted stacked z-filter media pack arrangement with side pieces thereon.

FIG. 11 is a bottom plan view of the filter cartridge used on the air cleaner of FIGS. 8-10.

FIG. 11A is a side elevational view of a preform shell for the filter cartridge depicted in FIG. 11, oriented with a top surface in typical use pointed upwardly, i.e., oriented in the same orientation as shown in the cross-section of FIG. 8.

FIG. 11B having the orientation corresponding to cross-section line 11B-11B, FIG. 7.

DETAILED DESCRIPTION

I. Z-Filter Media Configurations, Generally

Figure 1:
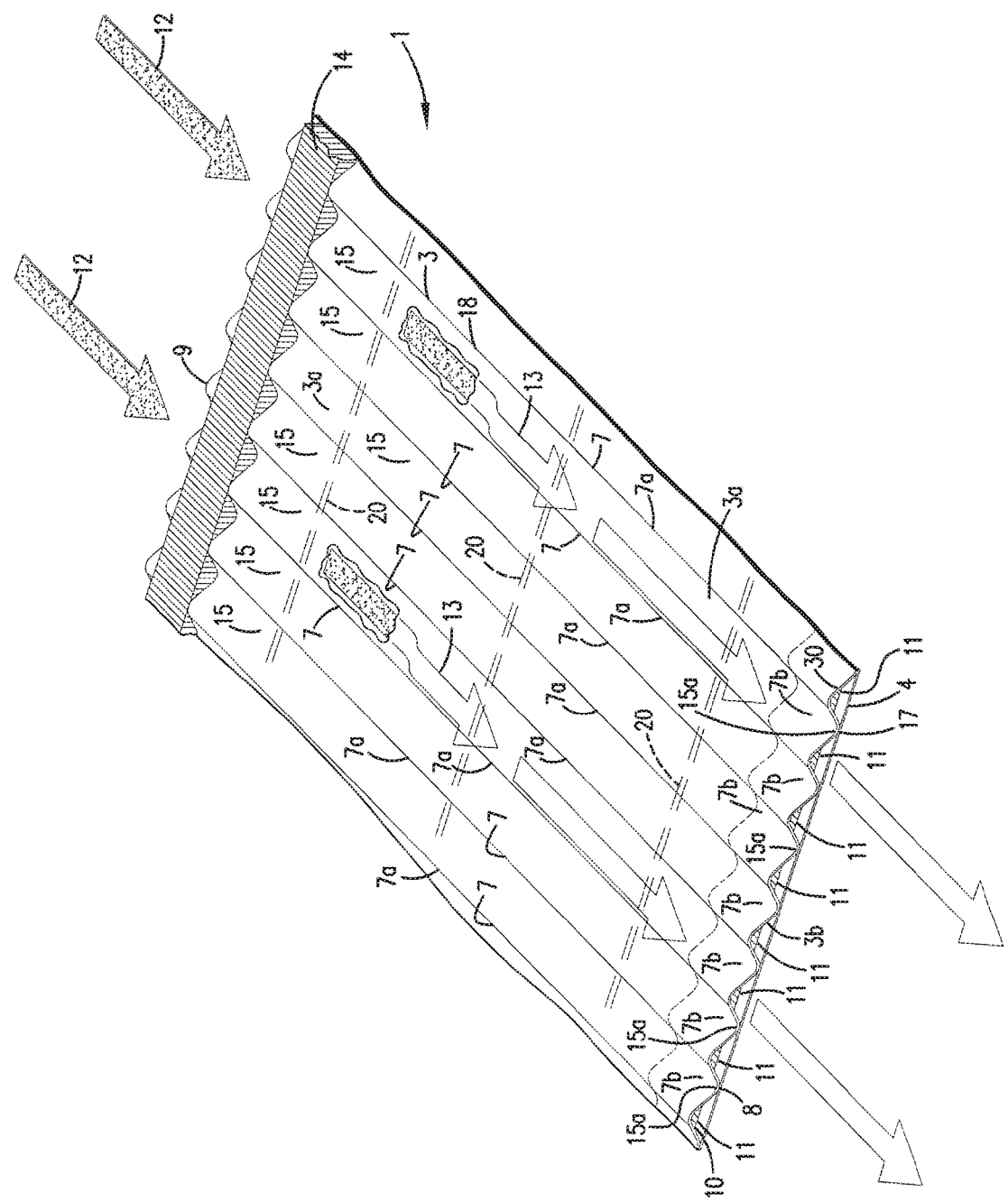
FIG. 1 is a fragmentary, schematic, perspective view of z-filter media useable in arrangements according to the present disclosure.

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media, utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

The fluted (typically corrugated) media sheet and the facing media sheet together, are used to define media having parallel inlet and outlet flutes. In some instances, the fluted sheet and facing sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of corrugated media secured to facing media, are stacked on one another, to create a filter construction. An example of this is described in FIG. 11 of U.S. Pat. No. 5,820,646, incorporated herein by reference.

Typically, coiling of the fluted sheet/facing sheet combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, now published as WO 04/082795, each of which is incorporated herein by reference. The resulting coiled arrangement generally has, as the outer surface of the media pack, a portion of the facing sheet, as a result.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner. In some instances, each of the inlet flow end and outlet flow end will be generally flat or planar, with the two parallel to one another. However, variations from this, for example non-planar faces, are possible.

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to allow for definition of inlet and outlet flutes; and/or a media pack constructed or formed from such media into a three dimensional network of inlet and outlet flutes; and/or, a filter cartridge or construction including such a media pack.

In FIG. 1, an example of media 1 useable in z-filter media is shown. The media 1 is formed from a (fluted corrugated) sheet 3 and a facing sheet 4.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. Although alternatives are possible, a typical radius for such z-filter media would be at least 0.25 mm and typically would be not more than 3 mm.

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, curved, wave pattern corrugated sheet 3 shown in FIG. 1, is that the individual corrugations are generally straight. By "straight" in this context, it is meant that through at least 70%, typically at least 80% of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is coiled and formed into a media pack, in general edge 9 will form an inlet end for the media pack and edge 8 an outlet end, although an opposite orientation is possible.

Adjacent edge 8 is provided a sealant bead 10, sealing the corrugated sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

Adjacent edge 9, is provided seal bead 14. Seal bead 14 generally closes flutes 15 to passage of unfiltered fluid therein, adjacent edge 9. Bead 14 would typically be applied as strips of the media 1 are secured to one another during stacking. Thus bead 14 will form a seal between a back side 17 of facing sheet 4, and side 18 of the next adjacent corrugated sheet 3. When the media 1 is cut in strips and stacked, instead of coiled, bead 14 is referenced as a "stacking bead." (When bead 14 is used in a coiled arrangement, not depicted herein, it is referenced as a "winding bead.")

Referring to FIG. 1, once the media 1 is incorporated into a media pack, for example by stacking, it can be operated as follows. First, air in the direction of arrows 12, would enter open flutes 11 adjacent end 9. Due to the closure at end 8, by bead 10, the air would pass through the media, for example as shown by arrows 13. It could then exit the media pack, by passage through open ends 15a of the flutes 15, adjacent end 8 of the media pack. Of course operation could be conducted with air flow in the opposite direction.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various fluted (for example corrugated) patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet. Such tacking is shown at 20.

Also, typically, the media contains a resin. During the corrugation process, the media can be heated to above the glass transition point of the resin. When the resin then cools, it will help to maintain the fluted shapes.

The media of the corrugated sheet 3 facing sheet 4 or both, can be provided with a fine fiber material on one or both sides thereof, for example in accord with U.S. Pat. No. 6,673,136, incorporated herein by reference.

An issue with respect to z-filter constructions relates to closing of the individual flute ends. Although alternatives are possible, typically a sealant or adhesive is provided, to accomplish the closure. As is apparent from the discussion above, in typical z-filter media, especially that which uses straight flutes as opposed to tapered flutes, large sealant surface areas (and volume) at both the upstream end and the downstream end are needed. High quality seals at these locations are important for proper operation of the media structure that results. The high sealant volume and area, creates issues with respect to this.

Figure 2:
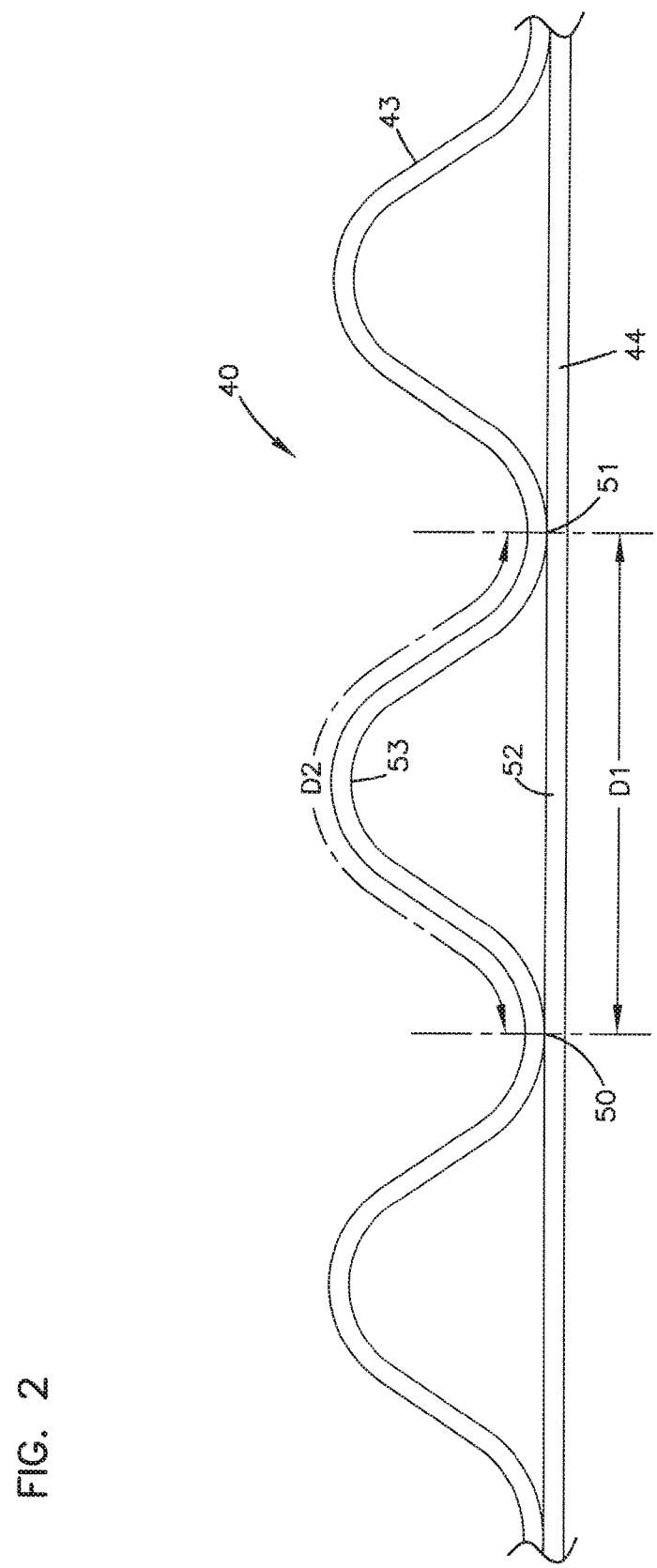
FIG. 2 is an enlarged schematic, cross-sectional view of a portion of the media depicted in FIG. 1.

Attention is now directed to FIG. 2, in which is schematically depicted a z-filter media construction 40 utilizing (as fluted sheet) a regular, curved, wave pattern corrugated sheet 43, and a non-corrugated flat sheet 44. The distance D1, between points 50 and 51, defines the extension of flat media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will often be at least 1.2 times D1. Typically, D2 would be within a range of 1.2-2.0, inclusive. One particularly convenient arrangement for air filters has a configuration in which D2 is about 1.25–1.35×D1. Such media has, for example, been used commercially in Donaldson Powercore™ Z-filter arrangements. Herein the ratio D2/D1 will sometimes be characterized as the flute/flat ratio or media draw for the corrugated media.

Figure 3:
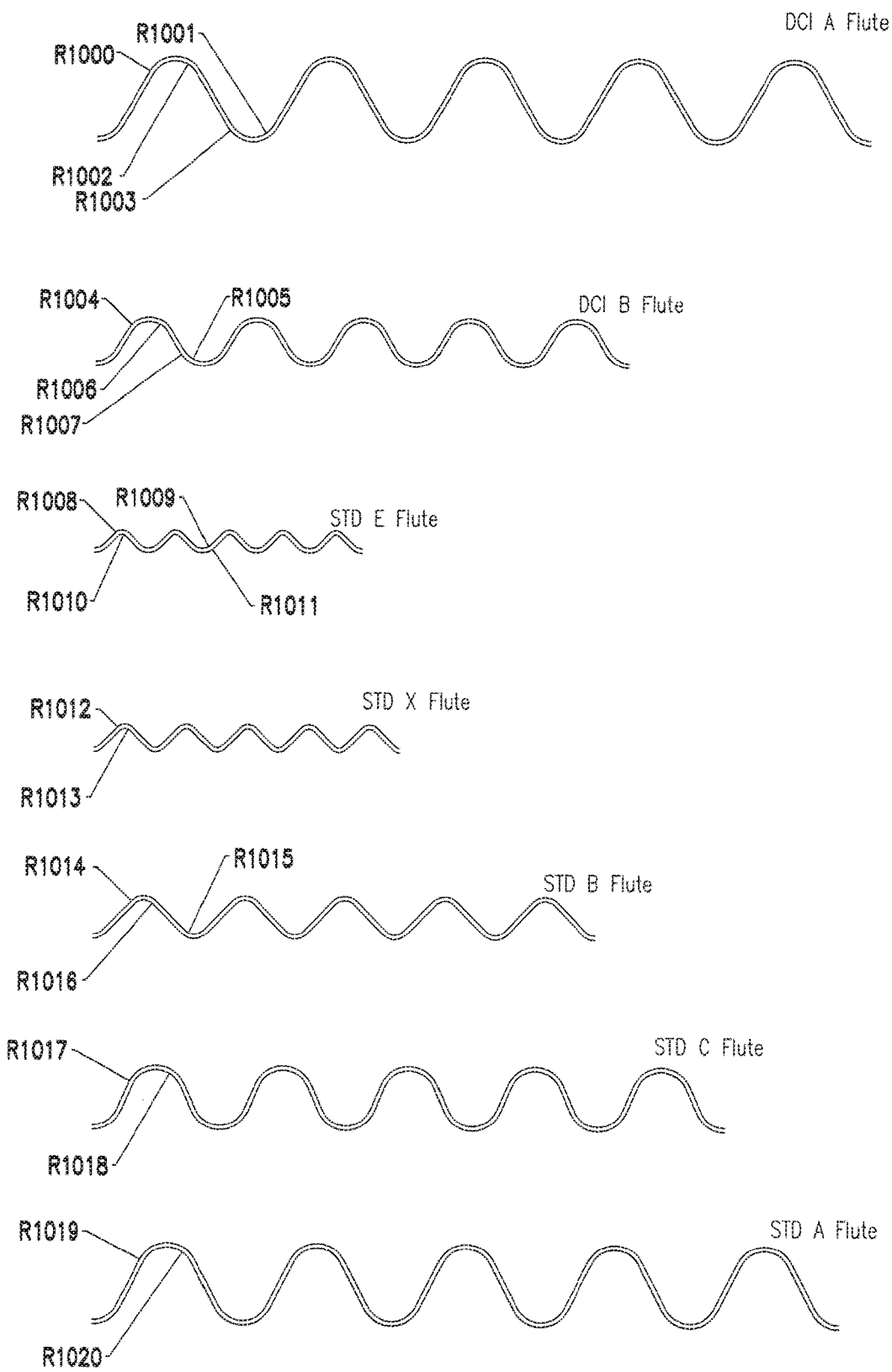
FIG. 3 is a schematic view of examples of various corrugated media definitions.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

| | |
|---|---|
| DCI A Flute: | Flute/flat = 1.52:1; The Radii (R) are as follows:<br>R1000 = .0675 inch (1.715 mm);<br>R1001 = .0581 inch (1.476 mm);<br>R1002 = .0575 inch (1.461 mm);<br>R1003 = .0681 inch (1.730 mm); |
| DCI B Flute: | Flute/flat = 1.32:1; The Radii (R) are as follows:<br>R1004 = .0600 inch (1.524 mm);<br>R1005 = .0520 inch (1.321 mm);<br>R1006 = .0500 inch (1.270 mm);<br>R1007 = .0620 inch (1.575 mm); |
| Std. E Flute: | Flute/flat = 1.24:1; The Radii (R) are as follows:<br>R1008 = .0200 inch (.508 mm);<br>R1009 = .0300 inch (.762 mm);<br>R1010 = .0100 inch (.254 mm);<br>R1011 = .0400 inch (1.016 mm); |
| Std. X Flute: | Flute/flat = 1.29:1; The Radii (R) are as follows:<br>R1012 = .0250 inch (.635 mm);<br>R1013 = .0150 inch (.381 mm); |
| Std. B Flute: | Flute/flat = 1.29:1; The Radii (R) are as follows:<br>R1014 = .0410 inch (1.041 mm);<br>R1015 = .0310 inch (.7874 mm);<br>R1016 = .0310 inch (.7874 mm); |
| Std. C Flute: | Flute/flat = 1.46:1; The Radii (R) are as follows:<br>R1017 = .0720 inch (1.829 mm);<br>R1018 = .0620 inch (1.575 mm); |
| Std. A Flute: | Flute/flat = 1.53:1; The Radii (R) are as follows:<br>R1019 = .0720 inch (1.829 mm);<br>R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media, although alternatives are possible. Comparisons above between the DCI A flute and DCI B flute, and the corrugation industry standard A and standard B flutes, indicate some convenient variations. Other flute definitions, corrugated or folded, could be used with the principles discussed herein.

II. Manufacture of Stacked Media Configurations Using Fluted Media, Generally

A. Overview of Process; Option of Darting Flutes

Figure 4:
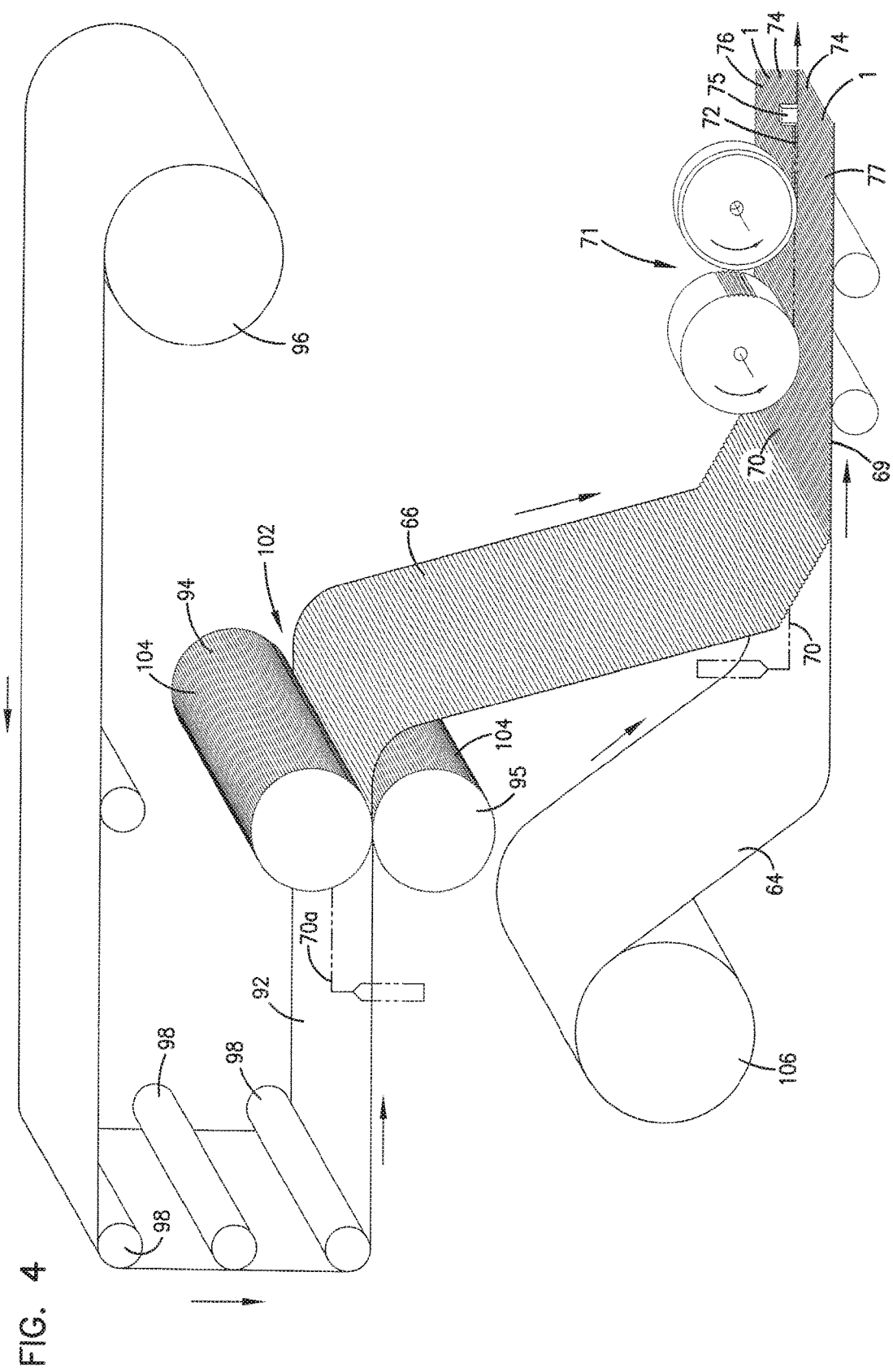
FIG. 4 is a schematic view of a process for manufacturing media according to the present disclosure.

In FIG. 4, one example of a manufacturing process for making a media strip corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 14, FIG. 1. An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location. The strips or pieces 76, 77 can then be cut across, for stacking, as described below in connection with FIG. 6.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 the media 74 must be formed. In the schematic shown in FIG. 4, this is done by passing a flat sheet of media 92 through a pair of corrugation rollers 94, 95. In the schematic shown in FIG. 4, the flat sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the flat sheet 92 becomes corrugated and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 are secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

The type of corrugation provided to the corrugated media is a matter of choice, and will be dictated by the corrugation or corrugation teeth of the corrugation rollers 94, 95. One convenient corrugation pattern will be a regular curved wave pattern corrugation, of straight flutes, as defined herein above. A typical regular curved wave pattern used, would be one in which the distance D2, as defined above, in a corrugated pattern is at least 1.2 times the distance D1 as defined above. In one preferred application, typically D2=1.25–1.35×D1. In some instances the techniques may be applied with curved wave patterns that are not "regular," including, for example, ones that do not use straight flutes.

Figure 5:
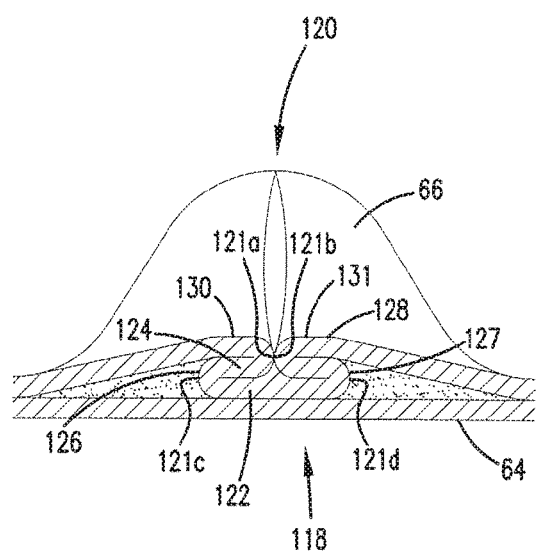
FIG. 5 is a cross-sectional view of an optional end dart for media flutes useable in arrangements according to the present disclosure.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121a, 121b, 121c, 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a preferred regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements folded against the inverted ridge.

Techniques for providing the optional dart described in connection with FIG. 5, in a preferred manner, are described in PCT WO 04/007054, incorporated herein by reference. Other techniques for media management are described in PCT application US 04/07927, filed Mar. 17, 2004, incorporated herein by reference.

Techniques described herein are well adapted for use of media packs that result from arrangements that, instead of being formed by coiling, are formed from a plurality of strips of single facer.

Opposite flow ends or flow faces of the media pack can be provided with a variety of different definitions. In many arrangements, the ends are generally flat and perpendicular to one another.

The flute seals (single facer bead, winding bead or stacking bead) can be formed from a variety of materials. In various ones of the cited and incorporated references, hot melt or polyurethane seals are described as possible for various applications. These are useable for applications described herein.

Figure 6:
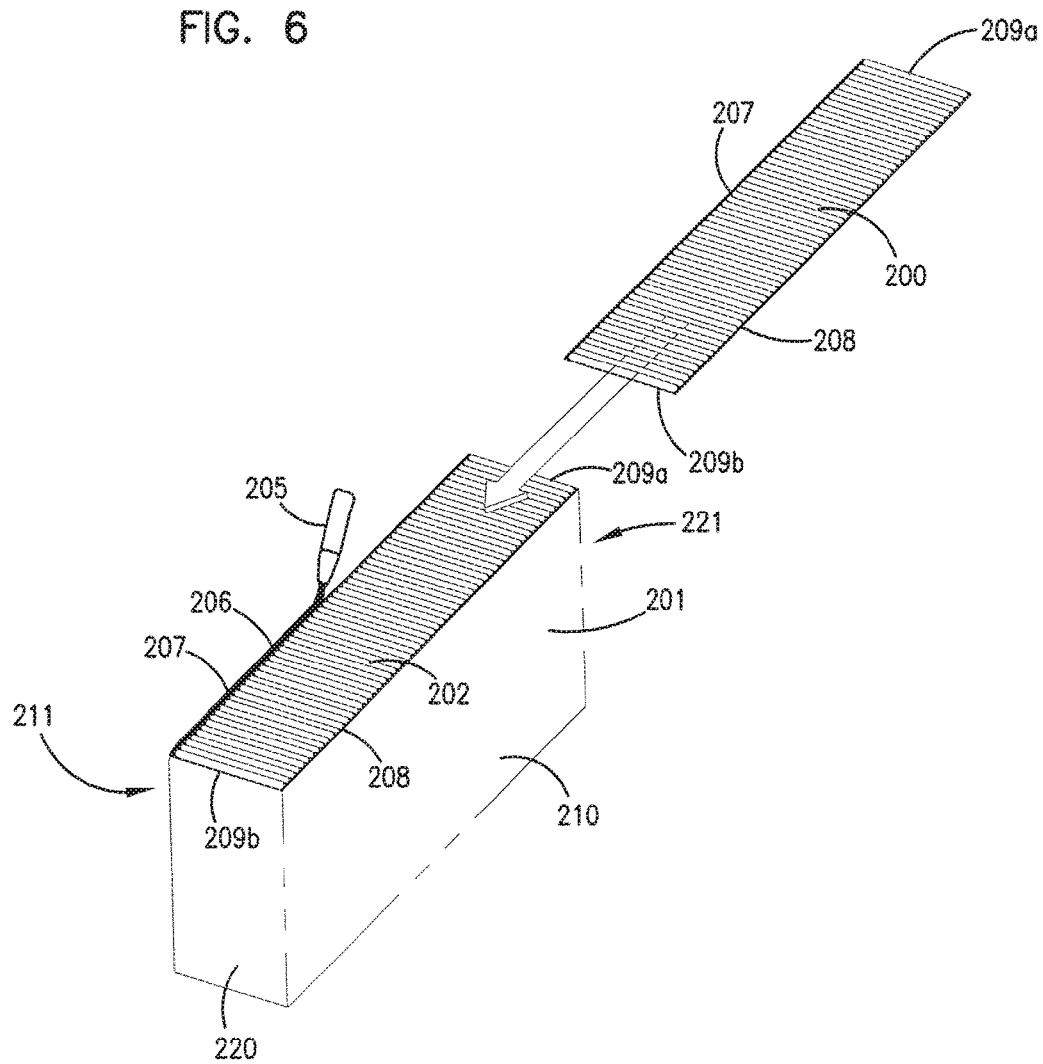
FIG. 6 is a schematic depiction of a step of creating a blocked, stacked z-filter media pack.

In FIG. 6, schematically there is shown a step of forming a stacked z-filter media pack from strips of z-filter media. Referring to FIG. 6, strip 200 is being shown added to a stack 201 of strips 202 analogous to strip 200. Strip 200 can be cut from either of strips 76, 77, FIG. 4. At 205, FIG. 6, application of a stacking bead 206 is shown, between each layer corresponding to a strip 200, 202 at an opposite edge from the single facer bead or seal. (Stacking can alternatively be done with each layer being added to the bottom of the stack, as opposed to the top.)

Referring to FIG. 6, each strip 200, 202 has front and rear edges 207, 208 and opposite side edges 209a, 209b. Inlet and outlet flutes of the fluted (typically corrugated) sheet/facing sheet combination comprising each strip 200, 202 generally extend between the front and rear edges 207, 208, and parallel to side edges 209a, 209b.

Still referring to FIG. 6, in the media pack 201 being formed, opposite flow faces are indicated at 210, 211. The selection of which one of faces 210, 211 is the inlet end face and which is the outlet end face, during filtering, is a matter of choice. In some instances the stacking bead 206 is preferably positioned adjacent the upstream or inlet face 211. The flow faces 210, 211, extend between opposite side faces 220, 221.

The stacked media pack 201 being formed in FIG. 6, is sometimes referred to herein as a "blocked" stacked media pack. The term "blocked" in this context, is an indication that the arrangement is formed to a rectangular block in which all faces are 90° relative to all adjoining wall faces.

Alternate configurations are possible, as discussed below in connection with FIG. 6A and certain of the remaining figures.

In some instances, media pack 201 will be referenced as having a parallelogram shape in any cross-section, meaning that any two opposite side faces extend generally parallel to one another.

It is noted that a blocked, stacked arrangement corresponding to FIG. 6 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003. All four of these latter references are incorporated herein by reference. It is noted that the stacked arrangement at FIG. 6 of U.S. Ser. No. 10/731,504, is a slanted stacked arrangement.

III. Example Air Cleaner Arrangement Including Stacked Z-Filter Media Pack

A. Side Edge Seal Arrangements for Stacked Z-Filter Media Packs.

Herein above, flute seal arrangements for z-filter media are discussed. Flute seals are generally the seals that are provided between the fluted (for example corrugated) sheet and the facing sheet (the single facer bead or seal); and, the seal provided between strips in the z-filter media pack (the stacker or winding bead).

Referring to FIG. 6, opposite side edges 209a, 209b of the various strips (200, 201) also need to be sealed against leakage. The sealing in general should be at two locations:
1. Between the single facer sheet and the fluted sheet, for each strip or layer (200, 202); and
2. Between the various strips or layers (200, 202).

The reason seals are preferred at these locations is to inhibit unfiltered air from reaching a downstream portion of an air cleaner arrangement, in which the media pack 201 is used.

Herein, an approach toward provision of side edge seals in stacked media pack is provided. It will be understood by reference to FIG. 6A.

Referring to FIG. 6A, a z-filter media pack 250 is depicted, schematically, comprising strips 251 of z-filter media (fluted sheet/facing sheet combinations) stacked on one another. Along side edges 252, 253, of the stack of strips 251, seals are desired, as noted above.

At side edge 252 an end piece 255 is depicted; and, at side edge 253 an analogous end piece 256 is depicted. The end pieces 255, 256 have the side edges of the various strips 251 secured thereto. Thus, the end pieces 255, 256 can provide side edge seals for single facer strips 251.

Preferably the end pieces 255, 256 are molded-in-place with the associated side edges or ends of the strips 251 embedded therein, during molding, to provide the seals. Typically the molded end pieces 255, 256 are molded from polyurethane. Typically and preferably a foamed polyurethane is used. Although alternatives are possible, one form of useable foamed polyurethane is one which is molded to an as-molded density of no greater than 30 lbs/cu.ft. (0.48 g/cc), typically no greater than 15 lbs/cu.ft. (0.24 g/cc), and in some instances no greater than 10 lbs/cu.ft. (0.16 g/cc). Although alternatives are possible, in many instances the end pieces 255, 256 will be molded to a hardness, Shore A, of no greater than 30, typically no greater than 25, and often 20 or less, for example 12 to 20. Harder, more dense, materials can be used, but they are not currently preferred, in some instances, for weight and cost savings. Softer, less dense, materials may be desirable, if they can be managed in the molding process.

It is noted that end pieces analogous to end pieces 255, 256 (except rectangular) can be used for the blocked stacked arrangement 201, FIG. 6. However the particular example 250 depicted in FIG. 6A, rather than being a blocked stacked arrangement, is a slanted stacked arrangement; the term "slanted" in this context, being meant to indicate that the opposite inlet and outlet flow surfaces 260, 261 do not extend perpendicularly to side (or top and bottom) surfaces 265, 266; the surfaces 265, 266 corresponding to the planar surfaces across which flutes of the z-filter media pack 250 extend.

Typically and preferably, surfaces 260, 261 are parallel to one another and, in overall feature, each is planar. It is noted that each surface 260, 261 actually comprises edges of individual strips stepped from one another, and thus each is not smooth and perfectly flat; however in general these media edges will define a planar surface. Thus, the media stack of media pack 250 can be described as having a parallelogram shape.

Typically and preferably an acute angle A, referred to herein as the acute slant angle, between one of surfaces 265, 266 and an adjacent one of surfaces 260, 261 is at least 30°; typically it is within the range of 30°-80°, inclusive, when the media pack is a slanted, stacked, arrangement, although alternatives are possible. In some arrangements an angle of about 40°-80°, inclusive, for example 60°, is used. For the particular embodiments described herein below in connection with FIGS. 9-13, the acute angle A is typically within the range of 40°-80°, inclusive, for example within the range of about 50°-70°, inclusive, a specific example being within the range of 55°-65°, inclusive.

Still referring to FIG. 6A, for the particular media pack 250 depicted, edges 270, 271 of end piece 255 extend generally parallel to one another, as do corresponding edges 272, 273 of end piece 256. Alternatives are possible.

Attention is directed to mold stand off indent arrangement 275 in end piece 255. An analogous stand off would be found in end piece 256 as well. Stand off indent arrangement 275 is an artifact from a method used to mold the end piece of FIG. 6A. In particular it represents a location in which a mold used to mold piece 255 included a raised portion to engage and support the media ends above a bottom of the mold, during molding. Although not required, it is noted that in some molding operations, the portion of the mold that forms region 276 may be sunken or lower relative to the portion of the molds region 278, as well, to advantage. If this latter is practiced, region 276 will be thicker than region 278. Of course, a variety of alternate stand-off patterns could be used.

Referring still to FIG. 6A, as an example for use in an arrangement as described below in connection with FIG. 7-14, assume that the inlet end of the media pack 250 is represented by face 260, and the outlet end by face 261. End piece 255 is recessed from face 260, as shown by space X. Typically an amount of such recess would be at least 6 mm, usually about 6 to 30 mm, inclusive, although alternatives are possible. This can be caused during the molding operation. Region 252X, which comprises a portion of the media pack 250 extending through region X, at side 252, will later be further sealed by a sealant when the media pack 250 is installed on a pre-form as described below. Similarly, side piece 256 is recessed at Y, and edge 253 is not covered in this region identified as 253Y. (Thus, the media pack 250 can be said to be positioned with the inlet flow faces 260 projecting outwardly from the molded side pieces 255, 256, a distance X of at least 6 mm, typically 6-30 mm.)

As indicated previously, end pieces 255, 256 can be molded-in-place, using conventional mold techniques for the rise in cure resin such as a polyurethane foam resin.

B. An Example Air Cleaner Arrangement, FIGS. 7-9.

Figure 7:
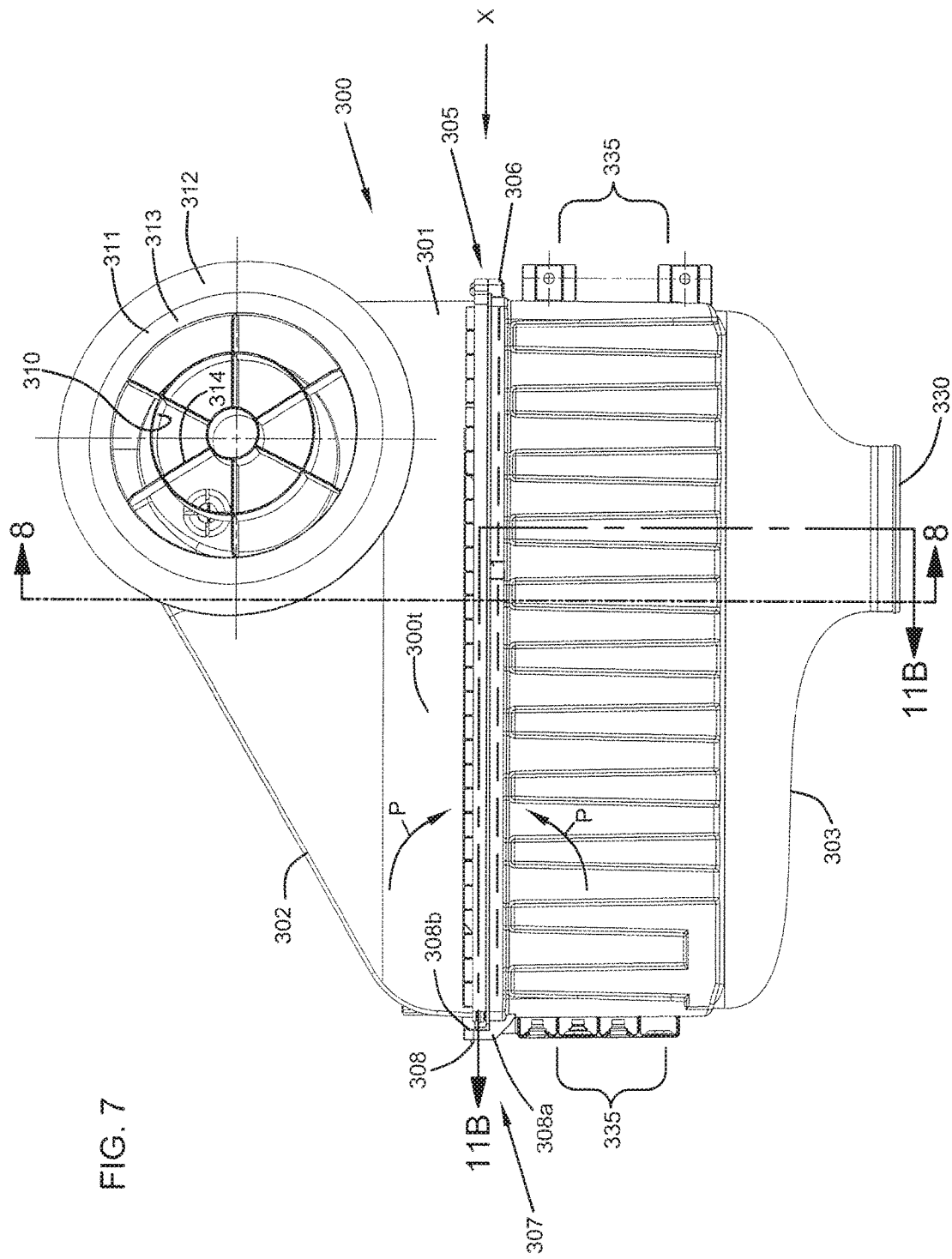
FIG. 7 is a top plan view of an air cleaner arrangement including a filter cartridge according to the present disclosure.
Figure 8:
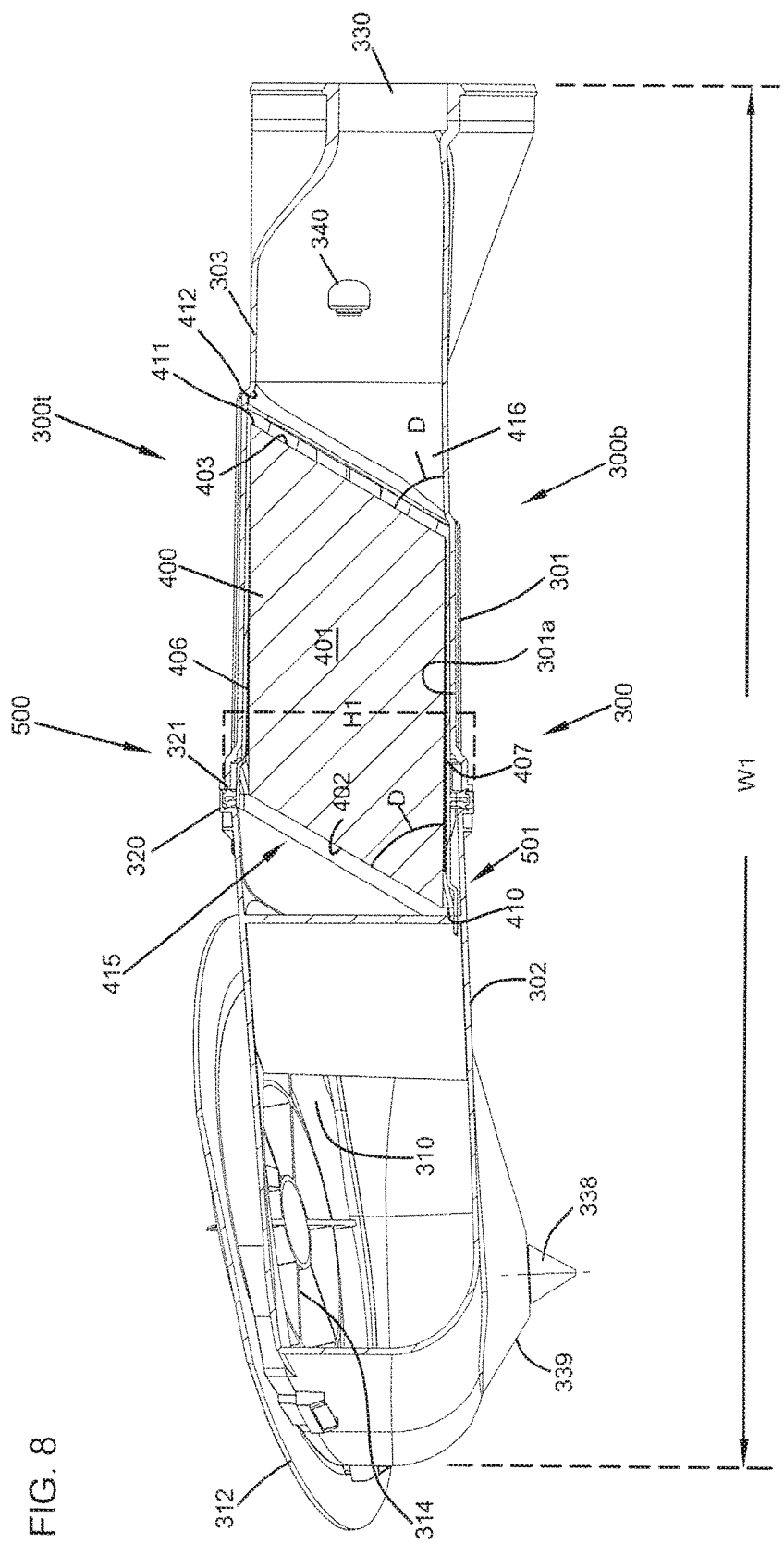
FIG. 8 is a schematic cross-sectional view of the air cleaner depicted in FIG. 7, taken along line 8-8 thereof.
Figure 9:
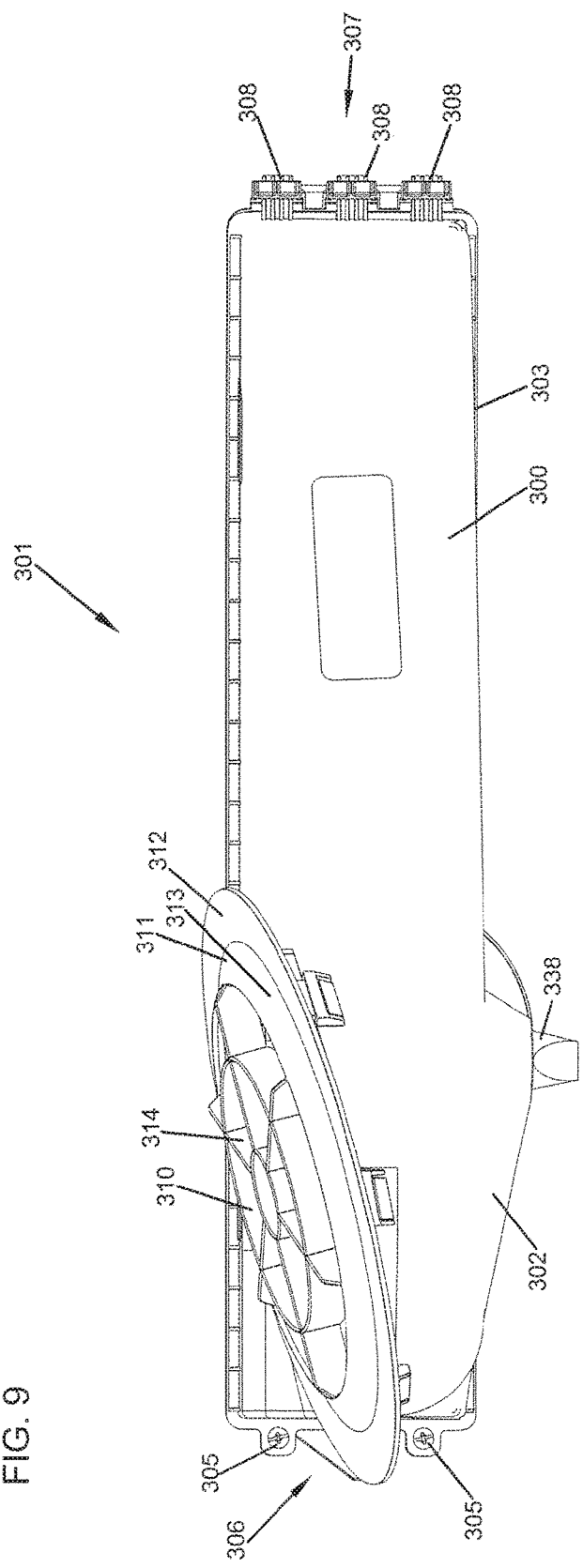
FIG. 9 is a schematic side elevational view of the air cleaner arrangement of FIG. 7, taken in the direction of letter X, FIG. 7.

In FIGS. 7-9 an example air cleaner arrangement 300 is depicted that is useable with a filter cartridge arrangement (or z-filter media construction) described below in connection with FIGS. 10-14, and using a media pack as discussed above with respect to FIGS. 1-6A. It is noted that a variety of different arrangements are possible using the principles of the present disclosure, the one depicted in FIGS. 7-9 being an example. With respect to the air cleaner 300, the filter cartridge is a serviceable component, i.e., it is removable for replacement after use.

Attention is first directed to FIG. 7 in which air cleaner 300 is depicted including a housing 301. Housing 301 is depicted in top plan view. The housing 301 comprises separable housing sections 302, 303, secured together. In the example, the sections 302, 303 are secured together by bolts 305, although clamps or other alternative attachment arrangements can be used for application of selected principles disclosed herein. The housing 301 can comprise molded plastic, although alternatives are possible.

More specifically, in referring to FIG. 9, bolts 305 are positioned on a side 306 of the air cleaner housing 301. At an opposite side 307 a disconnect hinge arrangement 308 is provided. By "disconnect hinge arrangement" in this context, it is meant that one of the housing sections 302, 303 includes a first member of the hinge arrangement (typically tabs or receivers), and a second one of the sections 302, 303 includes a second member of the hinge arrangement, the two hinge members being inter-engageable. The hinge members are formed, so that they can be disconnected as desired, by a user, upon opening of the housing 301. Thus, referring to FIG. 7, after hinge arrangements of site 307 are engaged, sections 302, 303 can be pivoted toward one another over arc P, bringing these sections together at 309, for attachment of bolts at 305.

Herein, the housing 301 will sometimes be said to have sides 306, 307, a top 300t and a bottom 300b.

Figure 15:
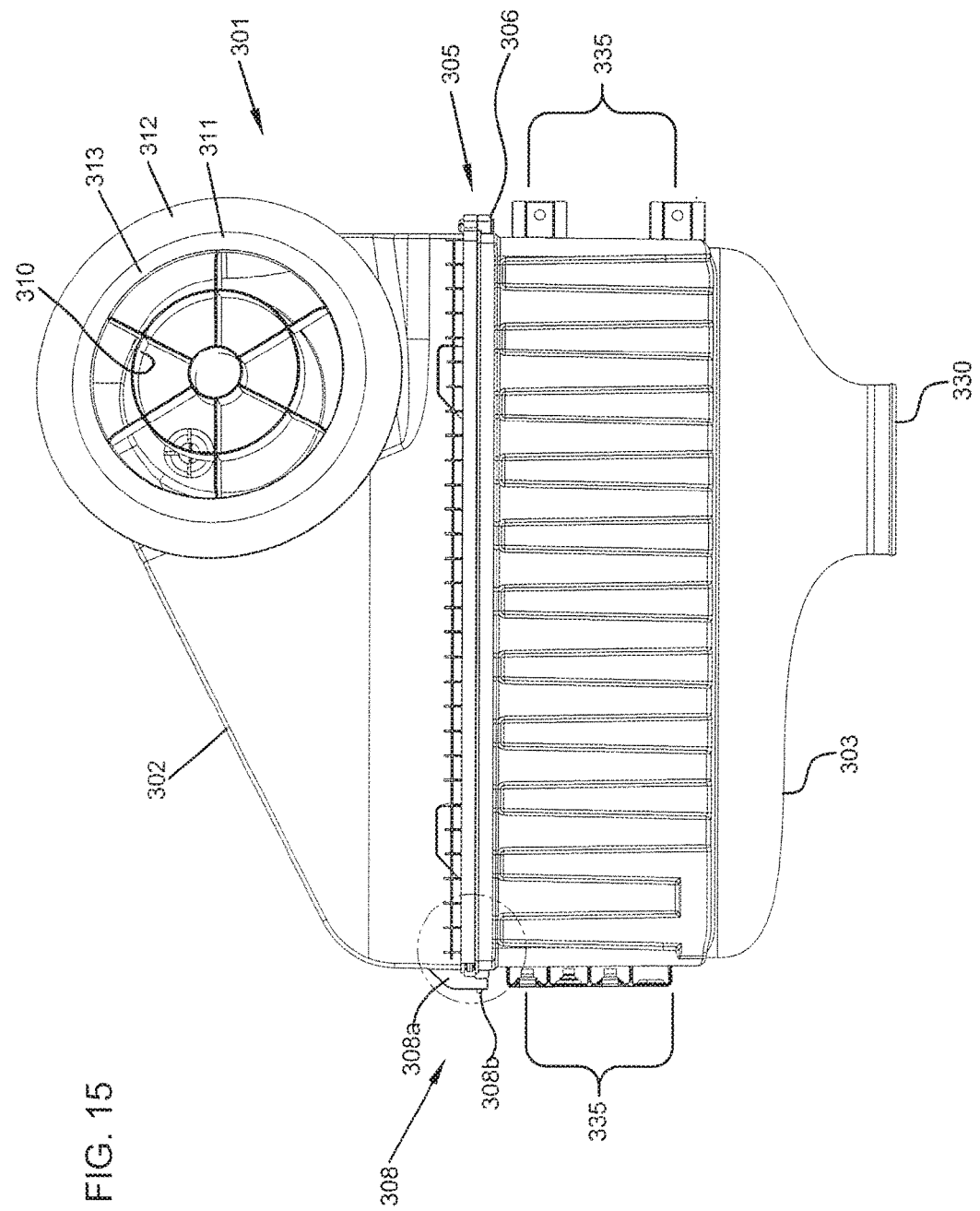
FIG. 15 is a top plan view of an alternate air cleaner arrangement to the air cleaner arrangement of FIG. 7.
Figure 16:
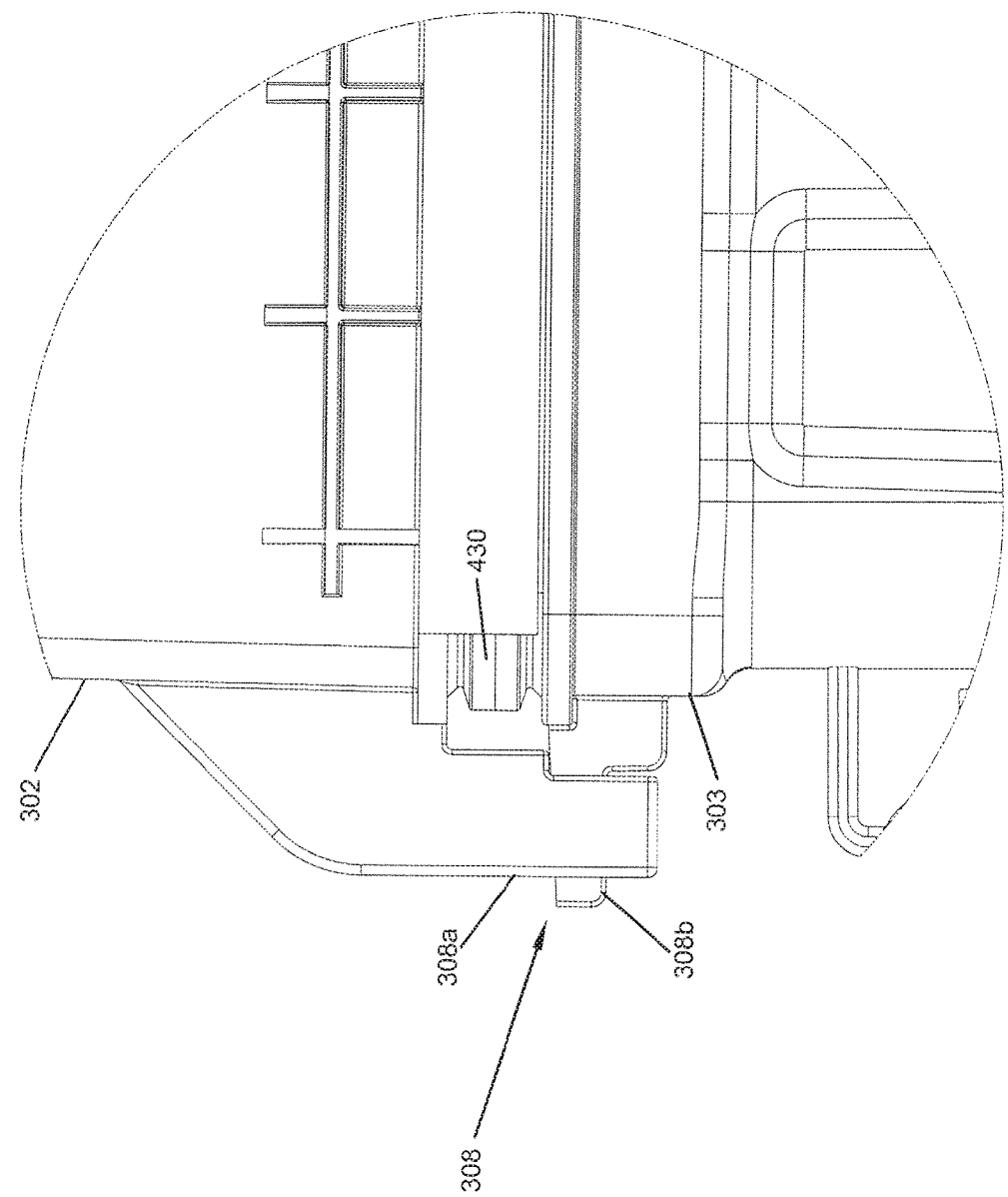
FIG. 16 is an enlarged fragmentary view of a portion of FIG. 15.

In the example shown, a tab arrangement 308a is shown on the housing section 303, projecting through a receiver arrangement 308b on section 302. It would be understood that a plurality of tabs 308a would be vertically spaced on cover section 303, and a plurality of receivers 308b would be spaced vertically on section 302. In some arrangements, an alternate organization in which the tabs are positioned on the inlet or cover section 302 and the receivers are positioned on housing section 303 would be used. This is shown in FIGS. 15 and 16, as discussed below.

Section 302 comprises an inlet section having air flow intake or inlet 310 therein. In use, a flexible collapsible bellows for inlet air, not shown, would be fit over inlet 310.

More specifically, inlet 310 is provided with an inlet adapter 311 comprising: an outer rim 312; slanted surface 313 and cross lattice 314. From a review of FIGS. 7-8, it will be understood that a bellows can be readily fit over aperture 310, by being centered upon engagement with slanted surface 313, to rest upon outer rim 312. Frame structure or face lattice 314 provides strength and, if desired, protection against large objects falling into the intake 310.

Section 303 is an outlet section including air flow outlet 330, through which filtered air leaves air cleaner housing 301 to be directed to downstream engine components.

Referring to FIG. 8, housing section 302 includes a perimeter flange 320; and housing section 303 includes perimeter flange 321. Flanges 320 and 321 are configured to be positioned on opposite sides of a housing seal arrangement, described below, for an internally received filter cartridge 400 (discussed below in connection with FIGS. 10-13).

In FIG. 8, a side cross-sectional view of air cleaner 300 housing 301 depicted, is configured to be mounted in the general orientation shown. The relatively low vertical relief depicted in FIG. 8 is convenient, for mounting the air cleaner 300 in small spaces under the hood of truck, for example on a portion of an engine or vehicle frame.

Referring to FIG. 7, a mount arrangement for securing the air cleaner 300 in position, on a vehicle, is shown at 335. It is noted that the mount arrangement 335 is positioned on a side portion of the air cleaner housing 301, to minimize vertical relief taken by the air cleaner 300.

Also, a water ejector port and valve arrangement 338 can be included in section 302, see FIG. 8. The water ejector port and valve arrangement 338 would typically be positioned to point downwardly, when the housing 301, is installed, and to be upstream from an internally received filter cartridge 400. In region 339 of section 302, the housing 301 is provide with a funnel shape around port and valve arrangement 338 to facilitate operation.

Although alternatives are possible, the housing 300 for the arrangement depicted has cross-sectional height H1, FIG. 8, in overlap with cartridge 400 that is no more than 50% of the housing side length or width W1, FIG. 7; and, typically no more than 35% of the housing length or width W1. (Herein height H1 disregards rings 311 and 312, and region 339. Rather focus for H1 is on a portion of the housing 301 overlapping the cartridge 400.) Although alternatives are possible, a characteristic of certain arrangements using principles according to the present disclosure, is a relatively low ratio of H1 to L1, for a housing seal. The housing seal vertical height, also represented by H1, is a total vertical distance the perimeter seal on the filter cartridge 400 extends, when sealed within the arrangement. In this instance, as discussed below, the seal is generally perpendicular to the air flow direction, and the total seal vertical height H1 is approximately the same as the seal height along the cartridge side.

The seal length L1, is shown in FIG. 7. This is the total length across atop or bottom of the housing 301 occupied by the housing seal member, and in extension between the housing sections 302, 303. L1 is meant to refer to the length across either the top or bottom. Although alternatives are possible, for typical arrangements according to the present disclosure the ratio of H1 to L1 is no greater than 0.3, and usually at least 0.15, typically no greater than 0.25 and often 0.24 or less, for example 0.16-0.24.

Referring to FIG. 8, at 340 structure is shown that can be used to provide for a pressure tap to monitor the pressure within air cleaner 300 on a downstream side of the cartridge 400.

C. A Filter Cartridge Including a Stacked Z-Filter Media Pack and an Outer Preform Useable in the Air Cleaner of FIGS. 7-9.

Referring first to FIG. 8, a cross-sectional view of air cleaner 300 is depicted. As indicated previously, a serviceable filter cartridge 400, for use within air cleaner 300 is depicted. By the term "serviceable" in this context, it is meant that the filter cartridge 400 can be removed from, and be replaced in, interior 301a of housing 301.

The filter cartridge 400 is discussed in detail below, in connection with FIGS. 10-13. Referring still to FIG. 8, the cartridge 400 includes media pack 401 having an upstream (inlet) face 402 and a downstream (outlet) face 403. Air to be filtered, generally enters the media pack at upstream face 402 and exits the media pack from downstream face 403. The media pack 401 comprises a z-filter media pack, in accord with the descriptions herein. Thus, the media pack 401 comprises flutes extending between upstream face 402 and downstream face 403. The flutes are divided, by flute seals as discussed above, into inlet and outlet flutes. The media pack 401 comprises stacks of fluted sheet material (typically folded or corrugated) secured to facing media. The cartridge 400 is configured so that air cannot pass from upstream face 402 to downstream face 403 without filtering flow through media as media pack 401.

The particular media pack 401 depicted in filter cartridge 400, FIG. 8, is a slanted stacked z-filter arrangement. That is, inlet face (or upstream face) 402 and outlet face (or downstream face) 403 are generally slanted relative to a cross-section view of cartridge 400 taken perpendicularly to the top 406 or bottom 407 of the media pack 401 and in a plane that intersects inlet and outlet faces 406, 407, as shown in FIG. 8. Angle D, an acute angle resulting from this slant for inlet and outlet faces 402 and 403, will typically be within the range of 30° to 80°, inclusive, often within the range of 40° to 80°, inclusive, typically 50°-70°, inclusive, although alternatives are possible. In the example shown, angle D is 55°-65°, inclusive, in particular 60°. (The angle of faces 402, 403 relative to a plane perpendicular to air flow would, of course, be 90°-D). It is noted that the principles described herein can be applied with blocked stacked media packs, in which inlet face and outlet face are generally parallel to one another and perpendicular to a top and bottom of the media pack. In such an instance, angle D would be 90°.

Still referring to FIG. 8, the particular cartridge 400 shown, with the slanted stacked media pack 401, is positioned with a tip or edge 410 of projection furthest toward inlet 310 positioned at bottom side 407 and with the tip or edge 411 of projection furthest toward outlet 330 positioned adjacent top side 406. The cartridge 400 could be positioned in some arrangements in an inverted manner relative to this. However the particular configuration presented is convenient and useful. The housing 401 can be provided with interior features that would inhibit installing cartridge 400 in an inappropriate manner relative to the configuration shown in FIG. 8. An example of a projection/receiver arrangement for this is discussed below in connection with FIGS. 11A and 11B. Also, housing section 303 includes diagonal receiver lip 412, to engage and receive the cartridge 400 in a proper orientation.

The filter cartridge 400 is depicted in FIGS. 10, 11, 11A, 12 and 13.

Figure 11B:
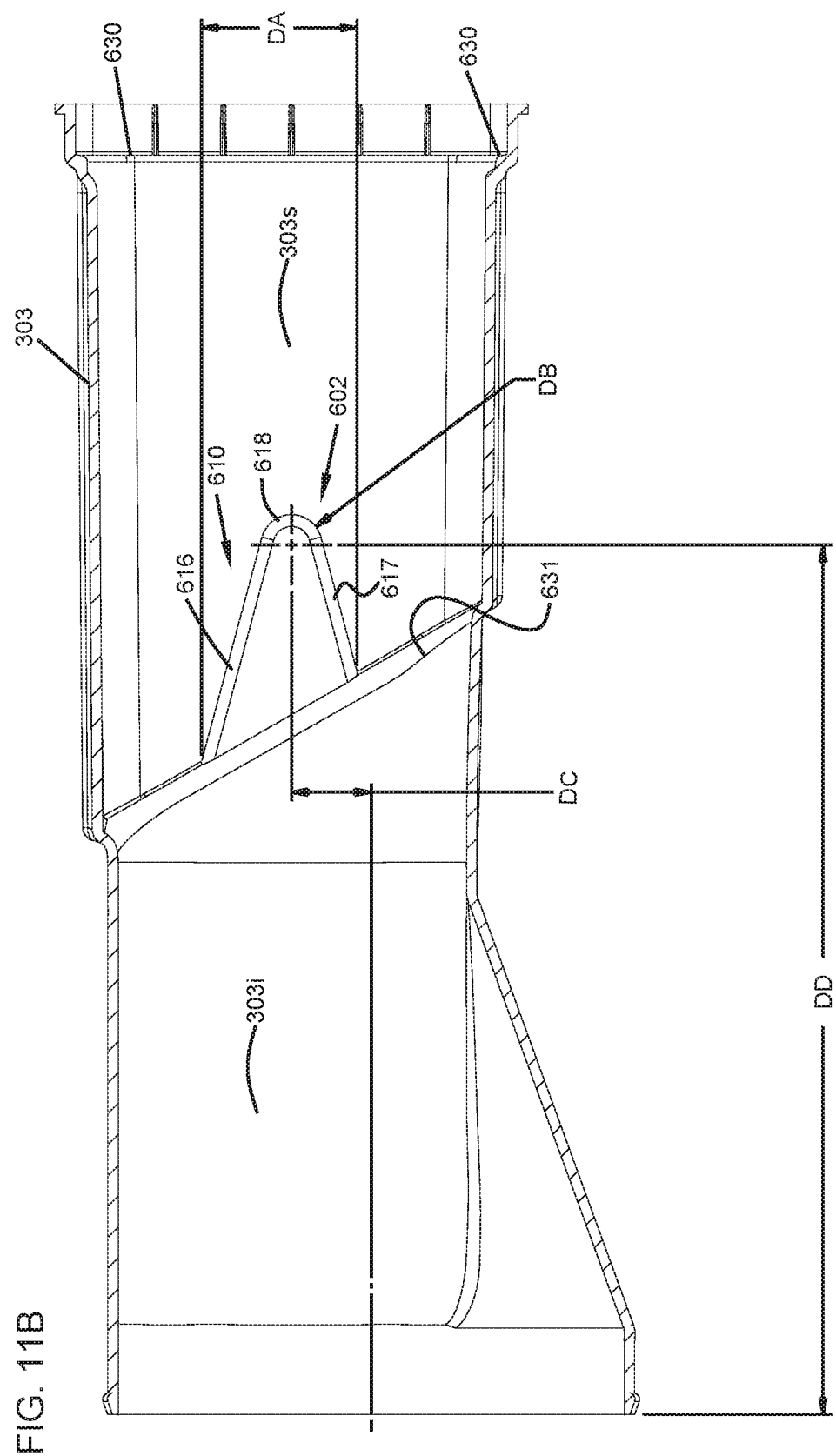
FIG. 11B is an enlarged cross-sectional view of an outlet section or portion of an air cleaner housing in which the cartridge of FIG. 11 can be positioned, during use.
Figure 12:
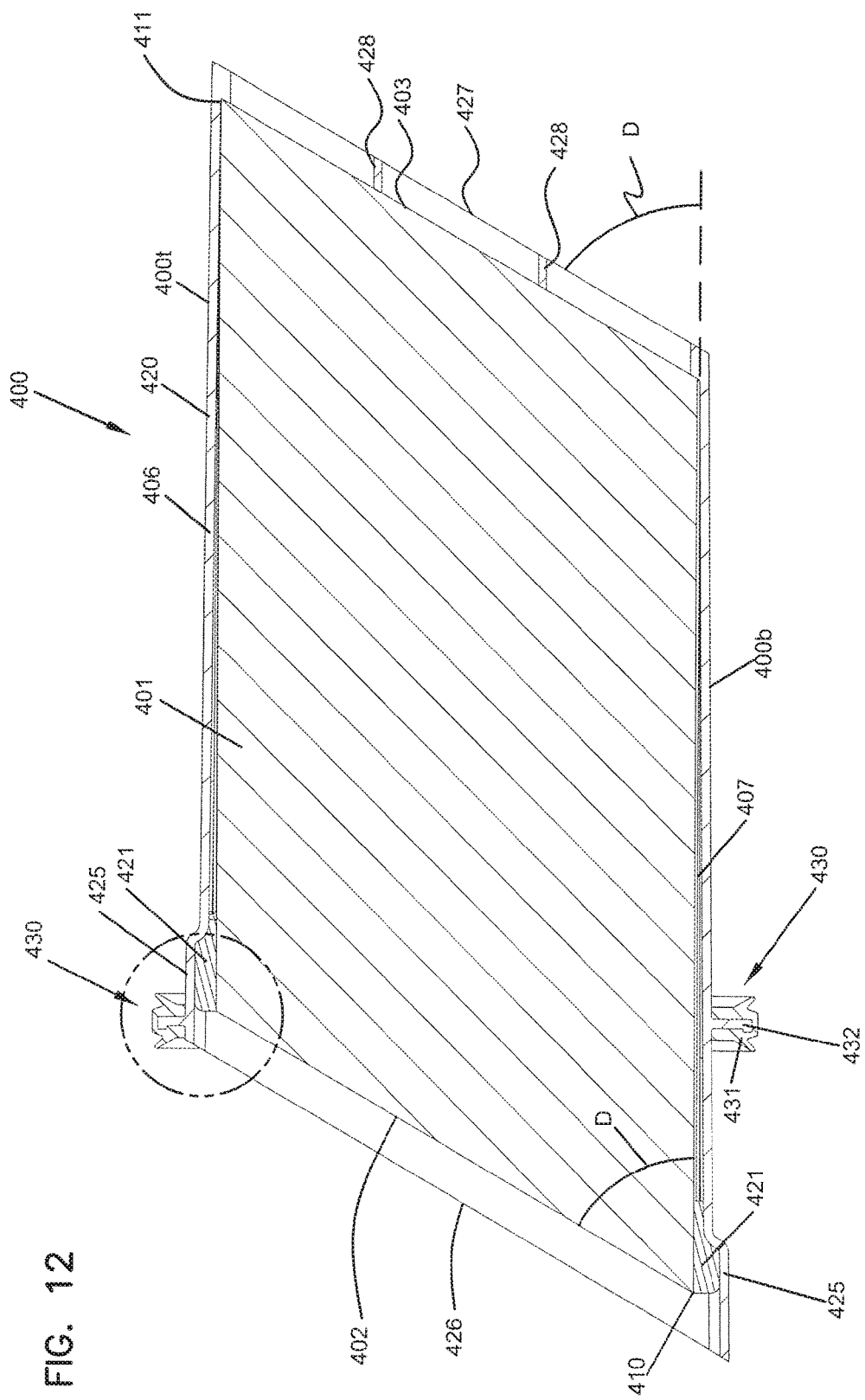
FIG. 12 is a schematic cross-sectional view of the cartridge depicted in FIG. 11, the cross sectional being taken along line 12-12 thereof; and, the cross section of FIG. 12 being presented in an orientation with a bottom of the cartridge depicted toward the bottom of FIG. 12.

Attention is first directed to FIG. 12, which shows cartridge 400 in cross-section, in the same general orientation as installed in air cleaner 300, FIG. 8. In general, the cartridge 400 comprises media pack 401 positioned within outer preform or shell 420, sometimes called a preform shell. By the term "preform" in this context, it is meant that the shell 420 is first formed and then media pack 401 is positioned therein. The preform or shell 420 would typically comprise a molded plastic such as a glass and/or mica filled polypropylene, although a variety of alternate materials could be used. The shell has a top 420$t$ and a bottom 420$b$. Referring to FIG. 11, it also has opposite sides 420$x$, 420$y$.

In FIG. 12, the media pack 401 is shown secured within preform 420 by sealant/adhesive 421. For the example shown sealant/adhesive 421 is positioned adjacent end face 402 extending around media pack 401 and extending along media pack 401, from face 402 toward face 403, a distance of about 6 to 30 mm, inclusive. Although this is typical, alternatives are possible. Adjacent end face 402 and around the media pack 401, preform 420 is provided with outer expansion region or lip 425, to accommodate the sealant 421. The sealant 425 is positioned adjacent a portion of the media pack 401 not covered by side pieces 255, 256, FIG. 6A.

The preform 420, then, generally includes air flow inlet end 426 and air flow outlet end 427. Expansion region or lip 425, is positioned adjacent inlet end 426. At outlet end 427 a grid 428 is provided, to support the media pack 401 adjacent end face 411. The grid 428 is discussed more below, in connection with FIGS. 10 and 11.

Still referring to FIG. 12, cartridge 400 includes housing seal arrangement 430 thereon. The housing seal arrangement 430 is a perimeter seal arrangement, the term "perimeter" in the context meaning that the housing seal arrangement 430 extends around a perimeter of the cartridge 400 (or shell 420). The housing seal arrangement 430 depicted comprises a seal member 431 positioned on preform 420, in the example shown on support 432. The support 432 would typically comprise a flange projecting outwardly from shell 420 in extension peripherally therearound. The flange 432 would typically be formed integrally with a remainder of shell 420, when shell 420 is a molded preform, although alternatives are possible.

Figure 13:
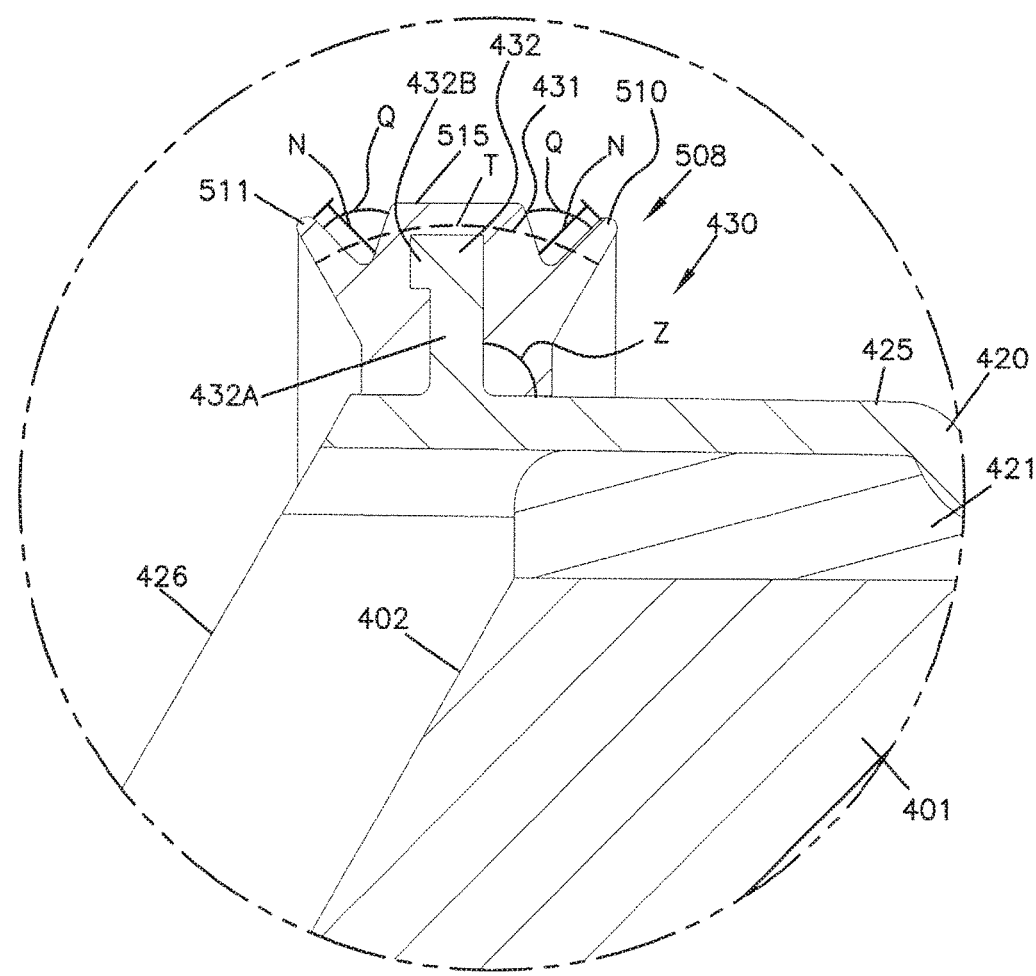
FIG. 13 is an enlarged fragmentary of a portion of FIG. 12.

Referring to FIG. 13, for the example shown the support 432 projects generally perpendicularly to an adjacent portion of the shell 420, as indicated at angle Z. This will be typical, although alternatives are possible. For the particular arrangement shown, as a result of the support 432 extending generally perpendicularly to an adjacent portion of shelf 420, the support 432 also extends generally perpendicularly to a direction of air flow through media pack 401. This too will be typical, although alternatives are possible.

Also, according to FIG. 13, for the example shown support 432 has a generally "L" shaped cross-sectional configuration, with support 432A and lateral extension 432B. Again, this will be typical, although alternatives are possible. The L-shaped cross-section helps secure seal member 431 in position. (The term "L-shaped" is used if, in at least one orientation, or from at least one perspective, the cross-section shows a "L" definition.)

The housing seal member 431 is secured to the post 432, typically by being molded thereon. The material of member 431 would typically be a flexible material, adequate for forming a pinch seal between housing sections 302, 303 when cartridge 400 is installed. A typical material for the seal 431 would be a flexible polymer, as discussed below.

Referring still to FIGS. 12 and 13, for the example shown, the housing seal 430 is centered in a plane perpendicular to a direction of extension between faces 402 and 403, although alternatives are possible. Thus, for the example shown, a plane of housing seal 430 extends non-perpendicularly to faces 402 and 403. In the example depicted the acute angle between a plane of housing seal 430 and surfaces 402, 403 is 90°-D. Alternatives are possible.

In general, housing seal member 431 is configured to form a pinch seal. Thus, sealing occurs when housing seal member 431 is clamped or secured between flanges 320 and 321 on housing section 302, 303 respectively. The seal is maintained, when the bolts 305 of FIGS. 7 and 9, are secured in position.

The particular housing seal member 431 depicted, is particularly configured for use under circumstances in which the compressive force of the bolts or other mechanism for securing the housing sections 302, 303 together are only positioned on a side section of the arrangement and do not extend across the long, upper and lower, faces 500, 501 FIG. 8. This will be the case, for example, when space is limited, for positioning of air cleaner 300. Of course the seal member 431 can also be used for other applications. For the arrangement shown, the compressive forces are generate at the sides by the bolts 305 on one side, and the hinge arrangement 307 at the opposite side.

To facilitate sealing, the seal member 431 is configured with a flexible lip arrangement 508 including at least one flexible lip member or extension and a central region. Herein, the term "flexible lip member or extension" or variants thereof, when used in connection with definition of a seal arrangement, it is meant to refer to a seal arrangement that includes a lip member or extension that extends (at an acute angle Q, FIG. 13) relative to an adjacent central region part of the seal member such that the lip member can flex (bend) out of its original orientation, for example by being bent toward the central region when pressure is applied, causing a seal as a flexible blade along a direction of extension.

In the example shown, flexible lip arrangement 508 includes two flexible lips or extensions 510, 511, FIG. 13. These lips or extensions 510, 511, can each fold or deflect (to reduce angle Q) towards central region 515 as seal 431 is pinched between housing sections 302, 303. Typically, the flaps or extensions 510, 511 will be positioned to extend at an angle T, relative to one another, at an angle within the range of 60° to 140°, inclusive, although alternatives are possible. Typically each extends at an acute angle Q, relative to an adjacent central region 515, within the range of 40° to 65°, inclusive, although alternatives are possible. Typically the direction of extension of flexible lips 510, 511 is outwardly away from the shell 420. Typically each flap extension or projection 510, 511 extends a distance of at least 2 mm, usually 3-5 mm inclusive (shown at N in FIG. 13) away from a closest portion of a center part 515 of the housing seal member 431. This will help ensure appropriate flexing, for engagement between the housing sections 302, 303, to ensure good seal. The tips of the extensions 510, 511 are typically spaced 10 to 18 mm apart.

For the particular example shown in FIG. 13, the housing seal arrangement has a generally "W" cross section, with the lips 510, 511, comprising the outside wings of the W, on opposite sides of central region 515. This particular cross-section, i.e., generally a W-shaped cross section, will be typical for preformed housing seal arrangements according to the present disclosure, although alternatives are possible.

Figure 14:
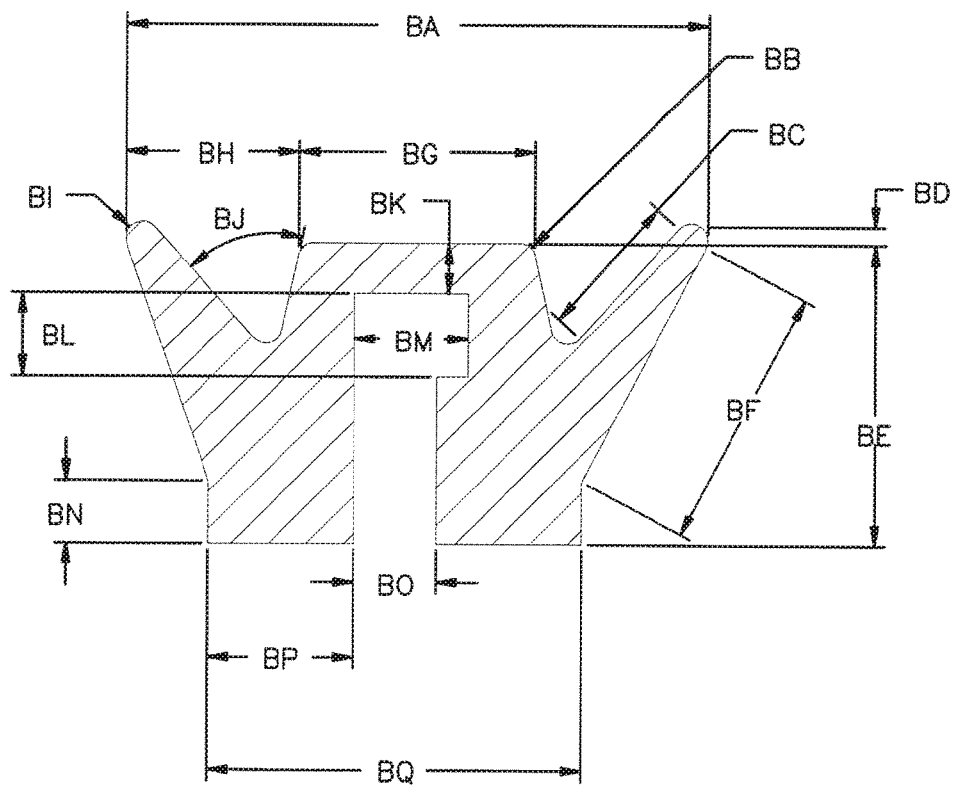
FIG. 14 is an enlarged cross-sectional view of a seal member depicted in FIG. 13.

Attention is now directed to FIG. 14, in which example dimensions at angles for housing seal arrangement are provided. The dimensions and angles are as follows: BA=12-16 mm, for example 14 mm; BB=0.3 mm radius; BC=3-5 mm; BD=0.4 mm; BE=7.2 mm; BF=6.3 mm; BG=5.7 mm; BH=4.2 mm; BI=0.4 mm radius; BJ=54.3'; BK=1.2 mm; BL=2.0 mm; BM=2.8 mm; BN=1.5 mm; BO=2.0 mm; BP=3.5 mm; and BQ=9.0 mm. Other dimensions can be obtained from the symmetry shown in FIG. 14. Of course, alternate dimensions are possible, the ones provided merely being of a typical useful example.

Above it was mentioned that an arrangement was provided for interaction between the filter cartridge 400 and the air cleaner housing 301, to ensure proper orientation. Selected features with respect to this are depicted in FIGS. 11A and 11B.

Referring to FIG. 11A, preform shell 420 is depicted. Again, the shell 420 includes a top 420t, bottom 420b, and opposite sides 420x and 420y (only one side 420x being viewable). The shell 420 further includes inlet end 420f and outlet 420g. In FIG. 11A, side 600 is viewable. Preform shell 420 includes a first member 601 of projection/receiver arrangement 602 positioned thereon. In the example shown the first member 601 comprises an arrow shaped receiver 601a having sides 604, 605 and central vertex 606, the sides 604, 605 and vertex 606 projecting outwardly from side 420x as an arrow shaped projection with a receiver interior 601i. The arrow shaped receiver 601a is oriented to project outwardly from side 420x with the vertex 606 pointed toward an inlet end 420f of the preform shell 420. In the example shown, the sides 604, 605 are not the same length relative to the vertex 606. The angle between the sides 605, 606 is typically 25°-60° inclusive, although alternatives are possible.

Attention is now directed to FIG. 11B. FIG. 11B is a cross-section of housing outlet section 303 taken generally along line 11B-11B, FIG. 7. In an interior 303i, outlet section 303 includes a side wall 303s with a second member 610 of the projection/receiver arrangement 602. The second member 610 is arrow shaped and includes opposite side 616 and 617, and central vertex 618. The second member 610 is a projection on sidewall 303s directed to point with vertex 618 toward a housing inlet section in use. (The angle between sides 617, 616 is typically 25°-60°, although alternatives are possible. In typical applications it will be the same as the angle between sides of the receiver 601.)

In general terms, first member 601 of the projection/receiver arrangement 602, positioned on a side of the preform shell 420, is a receiver, sized and shaped to slide over and to receive therein an arrow shaped projection on the housing therein, when properly installed. Preferably the receiver 601 is also arrow shaped, although alternatives are possible.

Of course in use, preform shell 420 would be configured with a seal member positioned on projection 432, typically and preferably the housing seal arrangement being analogous to those previously discussed, although alternatives are possible. Also typically and preferably a media pack such as those discussed above would be positioned within shell 420, during use.

D. Example Dimensions

The seal arrangement of FIG. 14 would be useable, for example, in a filter cartridge having dimensions as characterized in the figures as follows. Referring to FIG. 11: EA=283.6 mm; EB=641.0 mm; and EC=2.0 mm. Referring to FIG. 11A, CA=2.2 mm; CB=10.4 mm radius; CC=77.6 mm; CD=2.0 mm; CE=109.8 mm; CF=55.2 mm; CG=19.3 mm; CH=71.6 mm; CI=220.2 mm; CJ=63.4 mm; and CK=30°. Referring to FIG. 11B: DA=45 mm; DB=8.8 mm radius; DC=23.1 mm; and DD=252 mm.

Of course, the seal arrangement of FIG. 14 can be used in a variety of alternate air cleaner arrangements, with alternate sizes.

E. An Example End Grid

Figure 10:
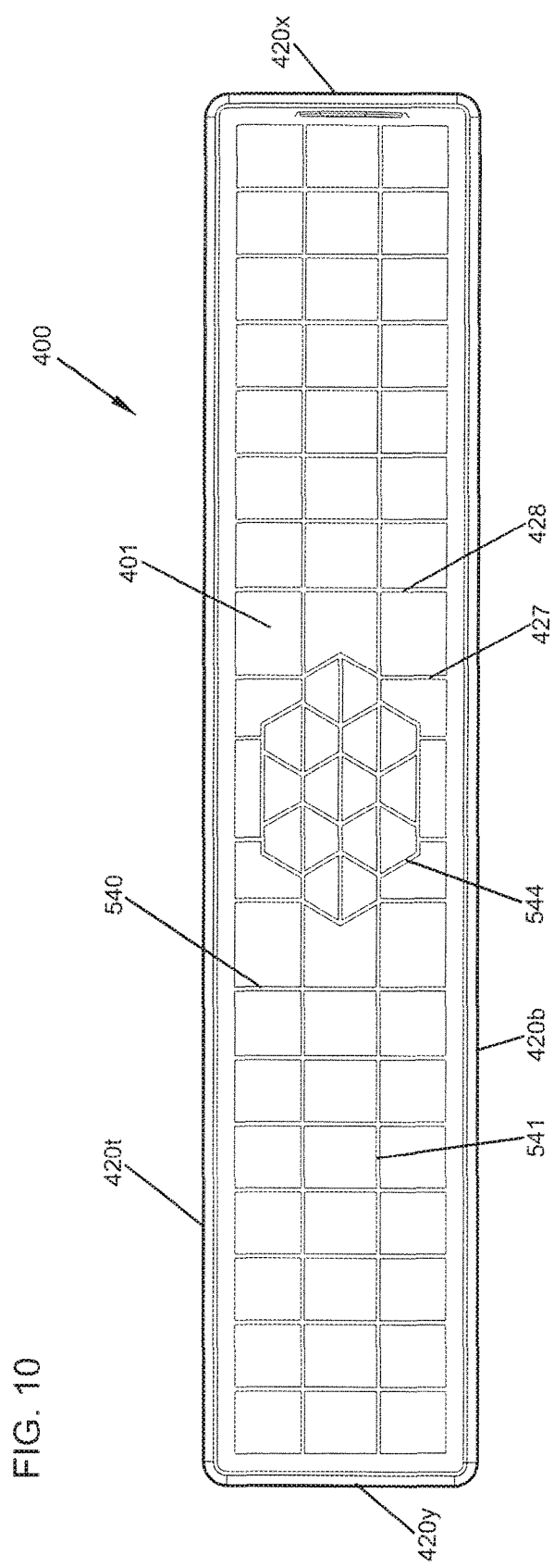
FIG. 10 is an end view of an exit or outlet end of a filter cartridge usable in the air cleaner of FIGS. 7-9.

Attention is now directed to FIG. 10. FIG. 10 is an end view of the cartridge 400. In particular, FIG. 10 is a view of outlet end 427. In FIG. 10, grid 428 is viewable. A variety of arrangements can be used for grid 428, its basic purpose to provide support to the media pack 401 at end 427. The particular grid 428 shown, comprises a plurality of parallel vertical braces 540 and horizontal braces 541. In central region, grid 427 is provided with decorative source indicating indicia 544.

In FIG. 11 a bottom view of cartridge 400 is depicted.

F. An Alternate Housing Arrangement, FIGS. 15 and 16.

In FIGS. 15 and 16 an alternate housing arrangement is shown. Many of the features are identical, and like reference numerals are identical or similar features are found. The air cleaner, FIG. 15, differs from the air cleaner of FIG. 7 with respect to the disconnect hinge arrangement. Referring to FIG. 16, for the air cleaner of FIGS. 15 and 16, the disconnect hinge arrangement 308 is positioned with tabs 308a on section 302, and receivers 308b on section 303.

In other manners the arrangements of FIGS. 15 and 16 would be the same of the arrangement of FIG. 7, and it can be used with the cartridge 400 described herein.

The choice between the housing of FIG. 7 and the housing of FIGS. 15 and 16 will depend in part upon the room available for surface access. The arrangement of FIGS. 15 and 16 has been found preferred, for at least an initial example application.

G. General Summary

In general, according to one aspect of the present disclosure there is provided as z-filter media construction which includes a media pack comprising z filter media, a preform shell having an inlet end and an outlet end, and a peripheral housing seal member positioned on the preformed shell. The housing seal member includes a central region and at least one flexible lip member positioned and configured to flex toward the central region and form a seal against a housing section in use. Typically and preferably the housing seal member includes first and second flexible lip members on opposite sides of the central region. In some arrangements the housing seal member has a W shaped cross section.

Typically the first and second extension or lip members extended away from the media pack at an angle within the range of 60° to 140°, inclusive, with respect to one another. The housing member is typically molded in place, and is secured on a projection extending outwardly from the preformed shell.

The housing seal member can comprise Nexprene 1054A available from Solvay Engineered products, Mansfield, Tex. 76063, although alternative materials can be used. The preform shell can comprise glass/mica filled propylene, although alternatives are possible.

The support on the preform shell would typically have an L-shaped cross-section, for securing the housing seal member in position.

The media pack within the filter cartridge typically has end faces and side faces extending between the end faces. A pair of opposite sides is embedded within molded in place side pieces, made for example from polyurethane. Typically and preferably adjacent an inlet face of the media pack, the side pieces are recessed with the face a distance of at least 6 mm, usually 6-30 mm.

The media pack can have a variety of shapes. Examples described are block stacked shapes and slanted stack shapes. When a slanted stack shape is made, and used, typically it has an internal angle within the range of 30-80°, inclusive, relative to a top or bottom.

A similar range of angles is typically provided in ends of the preform shell.

The media pack can be secured with the preform shell with a hot melt adhesive such as Bostik Findley H9389, available from Bostik, Inc., Wauwatosa, Wis., 53226, although alternatives are possible.

According to another aspect of the present disclosure an air cleaner arrangement is provided including a housing having an inlet section and an outlet section, with the filter cartridge as generally characterized herein sealingly positioned between the two housing sections, typically by the housing seal member being pinched between the housing sections. An example of such housing is provided which has a closure arrangement, for example bolts, only positioned in a side portion of the housing. The particular housing depicted utilizes a disconnect hinge arrangement, for separating the housing sections or moving the housing sections relative to one another.

According to another aspect of the present disclosure, a z-filter media construction for air filter is provided that includes a media pack comprising a z-filter media and a preform shell. The preform shell has a top, a bottom, and opposite sides. The preform shell includes a first member of a projection/receiver arrangement projecting outwardly from a side thereof. The first member of the projection/receiver arrangement is preferably receiver sized to receive an arrow shaped housing projection therein, when the z-filter media construction is installed in a housing for use. (The receiver slides over/around the projection.) A media pack is positioned within the preform shell such that air flowing between the inlet end and the outlet end of the preform shell must pass a filtering flow through the media pack. A perimeter housing seal member is positioned on the preform shell.

Typically the first member of the projection/receiver arrangement is an arrow shaped receiver projecting outwardly from the sidewall of the preform shell, and oriented with a vertex directed toward the inlet end of the preform shell. Typically and preferably a housing seal member is of a type previously described herein, with the central region at least one flexible lip member positioned and configured to flex toward the central region and form a seal against a housing section, in use.

According to yet another aspect of the present disclosure an air cleaner provided which includes a housing having an inlet section, and an outlet section, the outlet section having a sidewall with an arrow shaped projection thereon oriented with a vertex thereof directed toward the inlet section. A z-filter media construction is described above with a receiver positioned within the housing, with the arrow shaped projection of the housing sidewall received within the receiver of the preform shell.

What is claimed is:

1. An air cleaner assembly comprising:
   (a) a housing defining an interior and comprising separable first and second housing sections;
      (i) the first section comprising an inlet section including an air flow inlet therein;
      (ii) the second section comprising an outlet section having an air flow outlet therein;
      (iii) the housing having a first housing cross-sectional dimension that is no more than 50% of a second cross-sectional dimension taken perpendicular to the first housing cross-sectional dimension; and,
   (b) a serviceable filter cartridge removably mounted within the housing interior; the serviceable filter cartridge comprising:
      (i) a media pack comprising fluted media secured to facing media and configured to define opposite inlet and outlet flow faces;

(A) the media pack being configured so that air cannot pass into one face and out from the other flow face without filtering flow through the filter media;

(ii) a housing seal arrangement including a housing seal member non-removably positioned in extension around the media pack; and, (iii) the air filter cartridge including a first pair of first and second, opposite, sides;

(iv) a first member of a projection/receiver arrangement non-removably positioned on the first side of the first pair of first and second opposite sides of the air filter cartridge and oriented for receipt therein of a second member of a projection/receiver arrangement positioned in an air cleaner housing, in use;

(A) the first member of a projection/receiver arrangement comprising a receiver having opposite receiver sides that define a receiver space therebetween; the receiver space being open toward the outlet flow face and being closed by respective ones of the opposite receiver sides, along opposite sides of the receiver space, in a direction toward opposite portions of the media pack between the first pair of first and second, opposite, sides; and (B) the opposite receiver sides diverge from one another, along opposite sides of the receiver space, in a direction of extension toward the outlet flow face at an angle within a range of 25°-60°, inclusive;

(c) the housing including a second member of the projection/receiver arrangement thereon;

the second member comprising a projection member projecting into the receiver space of the receiver on the cartridge; and, (d) the housing seal member is positioned between the first and second housing sections.

2. An air cleaner assembly according to claim 1 wherein:
(a) the opposite receiver sides diverge from one another, along opposite sides of the receiver space, in a direction of extension toward the outlet flow face.

3. An air cleaner assembly according to claim 2 wherein:
(a) the receiver is closed at an end thereof directed toward the inlet flow face.

4. An air cleaner assembly according to claim 1 wherein:
(a) the opposite inlet and outlet flow faces are each planar and parallel to one another; and,
(b) the housing seal member extends around the media pack in a plane not parallel to the inlet and outlet flow faces.

5. An air filter cartridge for removable installation in an air cleaner housing; the air filter cartridge comprising:
(a) a media pack comprising fluted media secured to facing media and configured to define opposite inlet and outlet flow faces;
  (i) the media pack being configured so that air cannot pass into one face and out from the other flow face without filtering flow through the filter media;
(b) a housing seal arrangement including a housing seal member non-removably positioned in extension around the media pack; and,
(c) the air filter cartridge including a first pair of first and second, opposite, sides;
(d) a first member of a projection/receiver arrangement non-removably positioned on the first side of the first pair of first and second opposite sides of the air filter cartridge and oriented for receipt therein of a second member of a projection/receiver arrangement positioned in an air cleaner housing, in use;
  (i) the first member of a projection/receiver arrangement comprising a receiver having opposite receiver sides that define a receiver space therebetween; the receiver space being open in a direction toward the outlet flow face and being closed by respective ones of the opposite receiver sides, along opposite sides of the receiver space, in a direction toward opposite portions of the media pack between the first pair of first and second, opposite, sides; and
  (ii) the opposite receiver sides diverge from one another, along opposite sides of the receiver space, in a direction of extension toward the outlet flow face at an angle within a range of 25°-60°, inclusive.

6. An air filter cartridge according to claim 5 wherein:
(a) the filter cartridge includes a second pair of first and second, opposite, straight sides extending between the first pair of first and second, opposite, sides;
  (i) the first pair of first and second, opposite, sides including opposite straight side portions.

7. An air filter cartridge according to claim 6 wherein:
(a) the media pack is a blocked, stacked, media pack.

8. An air filter cartridge according to claim 5 wherein:
(a) the housing seal member is positioned on a support that extends around the media pack.

9. An air filter cartridge according to claim 5 wherein:
(a) the opposite inlet and outlet flow faces are each planar and parallel to one another; and,
(b) the housing seal member extends around the media pack in a plane not parallel to the inlet and outlet flow faces.

10. An air filter cartridge according to claim 5 wherein:
(a) the housing seal member includes a flexible lip member that extends around the perimeter of the media pack.

11. An air filter cartridge according to claim 5 wherein:
(a) the receiver is closed at an end thereof directed toward the inlet flow face.

12. An air filter cartridge according to claim 11 wherein:
(a) the receiver space extends to an end of the first side, of the first pair of opposite sides, adjacent the outlet flow face.

13. An air filter cartridge according to claim 11 wherein:
(a) the receiver is at a location: spaced from the housing seal member; and positioned between the housing seal member and the outlet flow face.

14. An air filter cartridge according to claim 5 wherein:
(a) the receiver is closed at an end thereof directed toward the inlet flow face.

15. An air filter cartridge according to claim 14 wherein:
(a) the receiver space extends to an end of the first side, of the first pair of first and second opposite sides, adjacent the outlet flow face.

16. An air filter cartridge according to claim 15 wherein:
(a) the receiver is at a location: spaced from the housing seal member; and, positioned between the housing seal member and the outlet flow face.

17. An air filter cartridge according to claim 5 wherein:
(a) the media pack having a non-circular media pack cross-sectional shape in a plane perpendicular to the fluted media and the direction of flow through the media pack; the cross-sectional shape having a first cartridge cross-sectional dimension that is no more than 50% of a second cartridge cross-sectional dimension perpendicular to the first cartridge cross-sectional dimension; each of the first cartridge cross-sectional dimension and second cartridge cross-sectional dimension being taken in a plane perpendicular to the direction of flow through the media pack.

18. An air filter cartridge according to claim 17 wherein:
(a) a ratio of the first cartridge cross-sectional dimension to the second cartridge cross-sectional dimension is no greater than 0.3.

19. An air filter cartridge according to claim 17 wherein:
(a) the first housing cross-sectional dimension is no more than 35% of the second housing cross-sectional dimension.

\* \* \* \* \*